(12) United States Patent
Huang et al.

(10) Patent No.: US 12,395,275 B2
(45) Date of Patent: Aug. 19, 2025

(54) TWO-STAGE FEEDBACK PROCEDURES

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Seyedkianoush Hosseini, San Diego, CA (US); Fang Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/760,288

(22) PCT Filed: Mar. 30, 2020

(86) PCT No.: PCT/CN2020/082072
§ 371 (c)(1),
(2) Date: Aug. 5, 2022

(87) PCT Pub. No.: WO2021/195837
PCT Pub. Date: Oct. 7, 2021

(65) Prior Publication Data
US 2023/0070974 A1    Mar. 9, 2023

(51) Int. Cl.
*H04L 1/1607* (2023.01)
*H04L 5/00* (2006.01)
*H04W 28/06* (2009.01)

(52) U.S. Cl.
CPC .......... *H04L 1/1671* (2013.01); *H04L 5/001* (2013.01); *H04L 5/0055* (2013.01); *H04W 28/06* (2013.01); *H04L 2209/34* (2013.01)

(58) Field of Classification Search
CPC ... H04L 1/0029; H04L 1/1671; H04L 1/1822; H04L 1/1825; H04L 5/001; H04L 5/0055; H04L 2209/34; H04W 28/06
See application file for complete search history.

(56) References Cited

U.S. PATENT DOCUMENTS 10,104,568 B2    10/2018   Chen et al.
2016/0337087 A1   11/2016   Chen et al.
(Continued)

FOREIGN PATENT DOCUMENTS

CN    102611521 A        7/2012
CN    102833868 A   *   12/2012
(Continued)

OTHER PUBLICATIONS

International Search Report and Written Opinion—PCT/CN2020/082072—ISA/EPO—Jan. 7, 2021 (202583WO1).
(Continued)

*Primary Examiner* — Shah M Rahman
(74) *Attorney, Agent, or Firm* — QUALCOMM IP DEPT.; James Hunt Yancey, Jr.

(57) ABSTRACT

Methods, systems, and devices for wireless communications are described. Feedback information associated with decoding downlink information may be reported in a first stage and a second stage. A size of the second stage may be restricted by an upper limit associated with an available set of uplink resources for transmitting the feedback information. Limiting the size of the second stage may include reducing a size of second information generated for the second stage, yielding third information for the second stage. The third information may be transmitted with first information generated for the first stage. Limiting the size of the second stage may also include generating second information having a reduced size based on determining that the (Continued)

upper limit may be exceeded. The reduced-size second information may be transmitted with the first information.

30 Claims, 20 Drawing Sheets

(56) References Cited

U.S. PATENT DOCUMENTS

| | | | | |
|---|---|---|---|---|
| 2017/0006491 | A1* | 1/2017 | Chen | H04L 1/1861 |
| 2017/0111898 | A1* | 4/2017 | Han | H04L 5/0057 |
| 2017/0310426 | A1* | 10/2017 | Fan | H04L 1/1893 |
| 2018/0338339 | A1* | 11/2018 | Song | H04L 5/001 |
| 2019/0021088 | A1* | 1/2019 | Zhang | H04W 72/0453 |
| 2019/0261278 | A1* | 8/2019 | Gupta | H04W 52/146 |
| 2020/0145148 | A1* | 5/2020 | Yeo | H04L 1/1685 |
| 2020/0178241 | A1* | 6/2020 | Wu | H04L 5/0055 |
| 2020/0235868 | A1* | 7/2020 | Yu | H04W 76/28 |
| 2020/0374043 | A1* | 11/2020 | Lei | H04L 1/1845 |
| 2021/0298062 | A1* | 9/2021 | Huang | H04W 72/23 |
| 2021/0360638 | A1* | 11/2021 | Lin | H04W 72/21 |

FOREIGN PATENT DOCUMENTS

| | | | | |
|---|---|---|---|---|
| CN | 110890943 | A * | 3/2020 | H04L 5/00 |
| CN | 110741578 | B | 6/2022 | |
| EP | 2624473 | A2 | 8/2013 | |
| EP | 3223554 | A1 | 9/2017 | |
| WO | WO-2011085230 | A2 | 7/2011 | |
| WO | WO-2016120461 | A1 | 8/2016 | |
| WO | WO-2017003878 | | 1/2017 | |
| WO | WO-2018005615 | A1 * | 1/2018 | H04L 1/1854 |
| WO | WO-2020030115 | A1 | 2/2020 | |

OTHER PUBLICATIONS

Supplementary European Search Report—EP20928173—Search Authority—The Hague—Sep. 22, 2023 (202583EP).

* cited by examiner

TWO-STAGE FEEDBACK PROCEDURES

CROSS REFERENCE

The present application is a 371 national stage filing of International PCT Application No. PCT/CN2020/082072 by Huang et al. entitled "TWO-STAGE FEEDBACK PROCEDURES," filed Mar. 30, 2020; which is assigned to the assignee hereof, and which is expressly incorporated by reference in its entirety herein.

FIELD OF TECHNOLOGY

The following relates generally to wireless communications and more specifically to two-stage feedback procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station communicates with a UE by transmitting control information and user data over a wireless channel between the base station and UE. To increase a reliability of subsequent transmissions from a base station to a UE, the UE may report feedback indicating whether a prior data transmission was successfully received and/or decoded by the UE. This feedback may be referred to as hybrid automatic repeat request (HARQ) feedback.

SUMMARY

The described techniques relate to improved methods, systems, devices, and apparatuses that support two-stage feedback procedures. Generally, the described techniques provide for providing additional feedback about a channel as part of a feedback procedure. Feedback information associated with a feedback procedure may include two stages of feedback information. Each stage of feedback information may include a different type of information. A first stage may include acknowledgements or negative acknowledgements for each feedback process supported. A second stage may include additional feedback information related to any downlink transmission that was not received successfully and thus included a negative acknowledgement in the first stage. The second stage of feedback information may include additional information about one or more channel characteristics or other information about the component carrier associated with that downlink signal that failed to be decoded. Techniques are also described for reducing a size of a second stage of feedback information.

A method of wireless communication at a UE is described. The method may include generating, for a first stage of feedback associated with a first set of uplink resources, first information that includes acknowledgment feedback associated with decoding downlink data information over each component carrier of a set of component carriers, generating, for a second stage of feedback associated with a second set of uplink resources, second information that is associated with a failure to decode downlink data information over one or more component carriers of the set of component carriers, generating third information that is associated with the failure to decode the downlink data information based on an upper limit for the feedback being exceeded by the first information and the second information, where the third information includes a reduction of the second information, and transmitting the first stage of feedback including the first information using the first set of uplink resources and the second stage of feedback including the third information using the second set of uplink resources.

An apparatus for wireless communication at a UE is described. The apparatus may include a processor, memory coupled with the processor, and instructions stored in the memory. The instructions may be executable by the processor to cause the apparatus to generate, for a first stage of feedback associated with a first set of uplink resources, first information that includes acknowledgment feedback associated with decoding downlink data information over each component carrier of a set of component carriers, generate, for a second stage of feedback associated with a second set of uplink resources, second information that is associated with a failure to decode downlink data information over one or more component carriers of the set of component carriers, generate third information that is associated with the failure to decode the downlink data information based on an upper limit for the feedback being exceeded by the first information and the second information, where the third information includes a reduction of the second information, and transmit the first stage of feedback including the first information using the first set of uplink resources and the second stage of feedback including the third information using the second set of uplink resources.

Another apparatus for wireless communication at a UE is described. The apparatus may include means for generating, for a first stage of feedback associated with a first set of uplink resources, first information that includes acknowledgment feedback associated with decoding downlink data information over each component carrier of a set of component carriers, generating, for a second stage of feedback associated with a second set of uplink resources, second information that is associated with a failure to decode downlink data information over one or more component carriers of the set of component carriers, generating third information that is associated with the failure to decode the downlink data information based on an upper limit for the feedback being exceeded by the first information and the second information, where the third information includes a reduction of the second information, and transmitting the first stage of feedback including the first information using the first set of uplink resources and the second stage of feedback including the third information using the second set of uplink resources.

A non-transitory computer-readable medium storing code for wireless communication at a UE is described. The code may include instructions executable by a processor to generate, for a first stage of feedback associated with a first set of uplink resources, first information that includes acknowledgment feedback associated with decoding downlink data information over each component carrier of a set of component carriers, generate, for a second stage of feedback associated with a second set of uplink resources, second information that is associated with a failure to decode downlink data information over one or more component carriers of the set of component carriers, generate third information that is associated with the failure to decode the downlink data information based on an upper limit for the feedback being exceeded by the first information and the second information, where the third information includes a reduction of the second information, and transmit the first stage of feedback including the first information using the first set of uplink resources and the second stage of feedback including the third information using the second set of uplink resources.

In some examples of the method, apparatuses, and non-transitory computer-readable medium described herein, the third information may be generated based on a combined size of the first information and the second information exceeding a first upper limit for the first stage of feedback and the second stage of feedback or a size of the second stage of feedback exceeding a second upper limit for the second stage of feedback.

Some examples of the method, apparatuses, and non-transitory computer-readable medium described herein may further include operations, features, means, or instructions for receiving a signal including a first indication of a first value of the first upper limit or a second indication of a second value of the second upper limit.

Some examples of the method, apparatuses, and non-transitory computer-readable medium described herein may further include operations, features, means, or instructions for receiving a signal including an indication of priority levels for the set of component carriers.

Some examples of the method, apparatuses, and non-transitory computer-readable medium described herein may further include operations, features, means, or instructions for receiving a second signal including an indication of a second priority level for a first component carrier of the set of component carriers based on a configuration of the first component carrier.

Some examples of the method, apparatuses, and non-transitory computer-readable medium described herein may further include operations, features, means, or instructions for performing a procedure for reducing a size of the second information based on the upper limit for the feedback being exceeded by the first information and the second information, where the third information may be generated based on performing the procedure.

In some examples of the method, apparatuses, and non-transitory computer-readable medium described herein, generating the third information may include operations, features, means, or instructions for discarding a first portion of the second information, where the reduction of the second information includes a second portion of the second information that may be different than the first portion of the second information.

In some examples of the method, apparatuses, and non-transitory computer-readable medium described herein, generating the third information further may include operations, features, means, or instructions for identifying a first subset of the second information that may be associated with a failure to decode first downlink data information over a first component carrier of the set of component carriers, the first subset of the second information having a first length, identifying a second subset of the second information that may be associated with a failure to decode second downlink data information over a second component carrier of the set of component carriers, the second subset of the second information having the first length, and selecting the first subset of the second information based on a first priority of the first component carrier relative to a second priority of the second component carrier, where the discarded first portion of the second information includes the selected first subset of the second information.

In some examples of the method, apparatuses, and non-transitory computer-readable medium described herein, generating the third information further may include operations, features, means, or instructions for adding, to the second portion of the second information, fourth information in place of the discarded first subset of the second information, the fourth information having a second length that may be smaller than the first length.

In some examples of the method, apparatuses, and non-transitory computer-readable medium described herein, generating the third information further may include operations, features, means, or instructions for selecting the second subset of the second information based on a combined size of the first information and the third information exceeding a first upper limit or a second size of the third information exceeding a second upper limit after the fourth information may be added, where the discarded first portion of the second information includes the selected second subset of the second information, and adding, to the second portion of the second information, fifth information in place of the discarded second subset of the second information, the fifth information having the second length.

In some examples of the method, apparatuses, and non-transitory computer-readable medium described herein, generating the third information further may include operations, features, means, or instructions for selecting the fourth information based on a third combined size of the first information and the third information exceeding the first upper limit or a third size of the third information exceeding the second upper limit after the fifth information may be added, and discarding the fourth information based on the selecting.

In some examples of the method, apparatuses, and non-transitory computer-readable medium described herein, the first subset of the second information discarded from the second information includes one of a first bit value for indicating a failure to receive a downlink control message associated with a downlink data message transmitted over the first component carrier, a second bit value for indicating a first quality of the first component carrier, a third bit value for indicating a second quality of the first component carrier, or a fourth bit value for indicating a third quality of the first component carrier, and the second subset of the second information discarded from the second information includes one of the first bit value for indicating a failure to receive a second downlink control message associated with a second downlink data message transmitted over the second component carrier, the second bit value for indicating the first quality of the second component carrier, the third bit value for indicating the second quality of the second component carrier, or the fourth bit value for indicating the third quality of the second component carrier.

In some examples of the method, apparatuses, and non-transitory computer-readable medium described herein, the fourth information added to the second portion of the second information includes one of a fifth bit value for indicating the failure to receive the downlink control message or a sixth bit value for indicating a fourth quality of the first component carrier based on the discarded first subset of the second information, where the fifth bit value and the sixth bit value include a fewer quantity of bits than the first bit value, the second bit value, the third bit value, or the fourth bit value, and the fifth information added to the second portion of the second information includes one of the fifth bit value for indicating the failure to receive the second downlink control message or the sixth bit value for indicating the fourth quality of the second component carrier based on the discarded first subset of the second information.

In some examples of the method, apparatuses, and non-transitory computer-readable medium described herein, generating the third information further may include operations, features, means, or instructions for identifying a first subset of the second information that may be associated with a failure to decode first downlink data information over a first component carrier of the set of component carriers, the first subset of the second information having a first length, identifying a second subset of the second information that may be associated with a failure to decode second downlink data information over a second component carrier of the set of component carriers, the second subset having the first length, and selecting a piece of the first subset of the second information based on a first priority of the first component carrier relative to a second priority of the second component carrier, where the discarded first portion of the second information includes the selected piece of the first subset of the second information.

In some examples of the method, apparatuses, and non-transitory computer-readable medium described herein, generating the third information may include operations, features, means, or instructions for encoding a first portion of the second information, where the reduction of the second information includes the encoded first portion and a second portion of the second information that may be different than the first portion of the second information.

In some examples of the method, apparatuses, and non-transitory computer-readable medium described herein, generating the third information further may include operations, features, means, or instructions for identifying at least one subset of the second information that may be associated with a failure to decode at least one set of downlink data information over at least one component carrier of the set of component carriers, the at least one subset of the second information having a first length, identifying a set of subsets of the second information that may be associated with a failure to decode multiple sets of downlink data information over multiple component carriers of the set of component carriers, the set of subsets of the second information having a first combined length, and selecting the set of subsets of the second information based on a first priority of the at least one component carrier relative to a second priority of the multiple component carriers, where the encoded first portion includes fourth information resulting from a combination of the selected set of subsets of the second information, the fourth information having a second length that may be smaller than a combined length of the set of subsets of the second information.

In some examples of the method, apparatuses, and non-transitory computer-readable medium described herein, the fourth information includes one of a first bit value for indicating a first combined quality of the multiple component carriers or a second bit value for indicating a second combined quality of the multiple component carriers.

In some examples of the method, apparatuses, and non-transitory computer-readable medium described herein, the fourth information includes one of a first bit value for indicating a failure to receive a downlink control message over at least one of the multiple component carriers or a second bit value for indicating a combined quality of the multiple component carriers.

In some examples of the method, apparatuses, and non-transitory computer-readable medium described herein, generating the third information may include operations, features, means, or instructions for encoding the second information, where the reduction of the second information includes the encoded second information.

In some examples of the method, apparatuses, and non-transitory computer-readable medium described herein, generating the third information may include operations, features, means, or instructions for identifying a set of subsets of the second information that may be associated with a failure to decode multiple sets of downlink data information over multiple component carriers of the set of component carriers, the set of subsets of the second information having a first combined length that may be equivalent to a first length of the second information and greater than a second length of the encoded second information.

In some examples of the method, apparatuses, and non-transitory computer-readable medium described herein, generating the third information may include operations, features, means, or instructions for determining a bit value of a set of bit values that corresponds to a combination of the set of subsets of the second information based on a table that provides a mapping between the set of bit values and a set of combinations of the set of subsets of the second information.

In some examples of the method, apparatuses, and non-transitory computer-readable medium described herein, generating the third information may include operations, features, means, or instructions for selecting the table from a set of tables based on a value of the upper limit and a quantity of the one or more component carriers over which the failure to decode downlink data information occurred.

In some examples of the method, apparatuses, and non-transitory computer-readable medium described herein, the second information may be associated with the failure to decode downlink data information over the one or more component carriers in one or more of a set of slots, and the third information may be generated based on a priority of a first slot of the set of slots relative to a second slot of the set of slots.

Some examples of the method, apparatuses, and non-transitory computer-readable medium described herein may further include operations, features, means, or instructions for receiving a signal including an indication of a priority level for each slot of the set of slots.

In some examples of the method, apparatuses, and non-transitory computer-readable medium described herein, the third information may be generated based on a combined size of the first information and the second information exceeding a first upper limit for the first stage of feedback and the second stage of feedback or a size of the second stage of feedback exceeding a second upper limit for the second stage of feedback, and a second combined size of the first information and the third information may be less than or equal to the first upper limit or a second size of the third information may be less than or equal to the second upper limit.

Some examples of the method, apparatuses, and non-transitory computer-readable medium described herein may further include operations, features, means, or instructions for determining that the combined size of the first information and the second information exceeds the first upper limit for the first stage of feedback and the second stage of feedback or that the size of the second information exceeds the second upper limit for the second stage of feedback.

Some examples of the method, apparatuses, and non-transitory computer-readable medium described herein may further include operations, features, means, or instructions for receiving one or more signals over the set of component carriers, and determining that downlink data information associated with the one or more component carriers failed to be successfully decoded.

In some examples of the method, apparatuses, and non-transitory computer-readable medium described herein, the first set of uplink resources may be part of a first physical uplink control channel resource and the second set of uplink resources may be part of a second physical uplink control channel resource different than the first physical uplink control channel resource, or, and the first set of uplink resources and the second set of uplink resources may be part of a same physical uplink control channel resource.

A method of wireless communication at a base station is described. The method may include transmitting, to a UE, a signal including a first upper limit for a first stage of feedback and a second stage of feedback or a second upper limit for the second stage of feedback, receiving, from the UE, using a first set of uplink resources and in the first stage of feedback, first information that includes acknowledgment feedback associated with a decoding of downlink data information by the UE over each component carrier of a set of component carriers, receiving, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decoding the third information based on the procedure for reducing the size of the second information.

An apparatus for wireless communication at a base station is described. The apparatus may include a processor, memory coupled with the processor, and instructions stored in the memory. The instructions may be executable by the processor to cause the apparatus to transmit, to a UE, a signal including a first upper limit for a first stage of feedback and a second stage of feedback or a second upper limit for the second stage of feedback, receive, from the UE, using a first set of uplink resources and in the first stage of feedback, first information that includes acknowledgment feedback associated with a decoding of downlink data information by the UE over each component carrier of a set of component carriers, receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decode the third information based on the procedure for reducing the size of the second information.

Another apparatus for wireless communication at a base station is described. The apparatus may include means for transmitting, to a UE, a signal including a first upper limit for a first stage of feedback and a second stage of feedback or a second upper limit for the second stage of feedback, receiving, from the UE, using a first set of uplink resources and in the first stage of feedback, first information that includes acknowledgment feedback associated with a decoding of downlink data information by the UE over each component carrier of a set of component carriers, receiving, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decoding the third information based on the procedure for reducing the size of the second information.

A non-transitory computer-readable medium storing code for wireless communication at a base station is described. The code may include instructions executable by a processor to transmit, to a UE, a signal including a first upper limit for a first stage of feedback and a second stage of feedback or a second upper limit for the second stage of feedback, receive, from the UE, using a first set of uplink resources and in the first stage of feedback, first information that includes acknowledgment feedback associated with a decoding of downlink data information by the UE over each component carrier of a set of component carriers, receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decode the third information based on the procedure for reducing the size of the second information.

Some examples of the method, apparatuses, and non-transitory computer-readable medium described herein may further include operations, features, means, or instructions for transmitting, to the UE, a second signal including an indication of the procedure for reducing the size of the second information, where the procedure for reducing the size of the second information includes a first set of operations for discarding a first portion of the second information, a second set of operations for encoding a second portion of the second information, or a third set of operations for encoding an entirety of the second information.

In some examples of the method, apparatuses, and non-transitory computer-readable medium described herein, decoding the third information may include operations, features, means, or instructions for decoding the third information based on a first portion of the second information that may be discarded by the UE based on priority levels of the one or more component carriers, a second portion of the second information that may be encoded by the UE based on priority levels of the one or more component carriers, or an entirety of the second information that may be encoded by the UE.

Some examples of the method, apparatuses, and non-transitory computer-readable medium described herein may further include operations, features, means, or instructions for determining priority levels for the set of component carriers, and transmitting, to the UE, a second signal including an indication of the priority levels for the set of component carriers.

Some examples of the method, apparatuses, and non-transitory computer-readable medium described herein may further include operations, features, means, or instructions for determining an updated priority level for a first component carrier of the set of component carriers, and transmitting, to the UE, a third signal including a second indication of the updated priority level for the first component carrier.

Some examples of the method, apparatuses, and non-transitory computer-readable medium described herein may further include operations, features, means, or instructions for determining priority levels for a set of slots associated with the set of component carriers, and transmitting, to the UE, a second signal including an indication of the priority levels for the set of slots.

In some examples of the method, apparatuses, and non-transitory computer-readable medium described herein, the signal includes a first indication of a first value of the first upper limit or a second indication of a second value of the second upper limit.

Some examples of the method, apparatuses, and non-transitory computer-readable medium described herein may further include operations, features, means, or instructions for transmitting, to the UE, a second signal including an indication of a set of tables, each table including a correspondence between a set of bit values and a set of combinations of a set of subsets of the second information and corresponding to a combination of a first value of the first upper limit or a second value of the second upper limit and a quantity of the one or more component carriers over which the failure to decode downlink data information occurred.

DETAILED DESCRIPTION

A wireless communications system may support communications that are communicated according to low-latency parameters, high-reliability parameters, or both—for example, ultra-reliable low-latency communications (URLLC) or mission critical communications. In such examples, it may be desirable to reduce a quantity of retransmissions that occur as part of a hybrid automatic repeat request (HARQ) process to ensure latency or reliability parameters are satisfied. To that end, feedback information used in a HARQ process may be configured to include acknowledgements (ACKs)/negative ACKs (NACKs) and channel information used to adjust one or more parameters associated with the HARQ retransmission of the message.

Techniques are described for providing additional feedback about a channel as part of a HARQ feedback procedure. Feedback information associated with a HARQ procedure may include two stages of feedback information. Each stage of feedback information may include a different type of information. A first stage of feedback information may include ACKs or NACKs for each HARQ process supported. A second stage of the feedback information may include additional feedback information related to any downlink transmission that was not received successfully and thus included a NACK in the first stage. The second stage of feedback information may include additional information about one or more channel characteristics or other information about the component carrier associated with that downlink signal that failed to be decoded. Techniques are also described for reducing a size of a second stage of feedback information—e.g., if a size of the first stage and second stage of feedback information exceeds a limit.

Aspects of the disclosure are initially described in the context of wireless communications systems. Aspects of the disclosure are described in the context of communication diagrams. Aspects of the disclosure are further illustrated by and described with reference to apparatus diagrams, system diagrams, and flowcharts that relate to two-stage feedback procedures.

Figure 1:
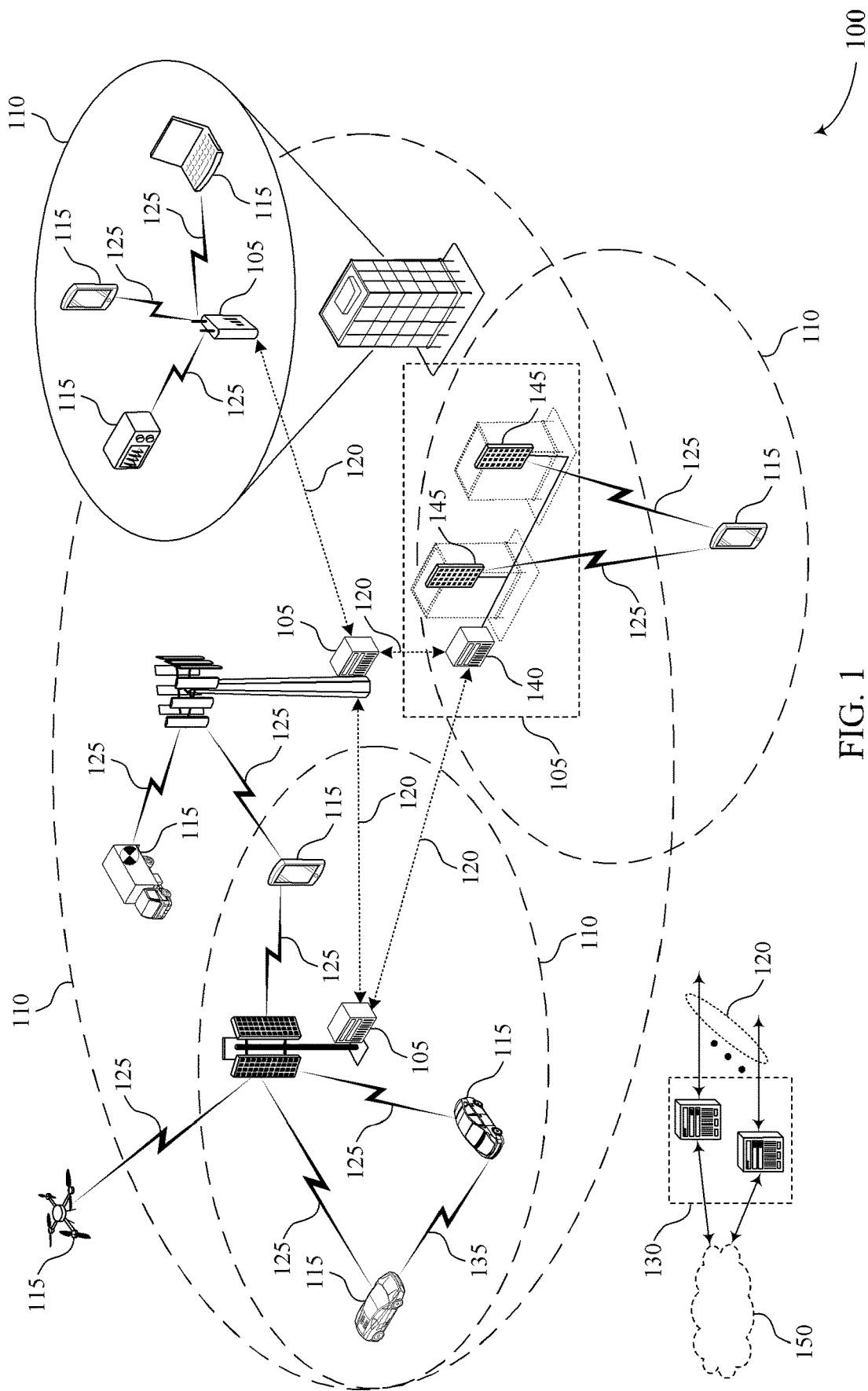
FIG. 1 illustrates an example of a wireless communications system that supports two-stage feedback procedures in accordance with aspects of the present disclosure.

FIG. 1 illustrates an example of a wireless communications system 100 that supports two-stage feedback procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Methods, systems, and devices for wireless communications are described. Techniques are described for providing additional feedback about a channel as part of a feedback procedure. Feedback information associated with a feedback procedure may include two stages of feedback information. Each stage of feedback information may include a different type of information. A first stage may include acknowledgements or negative acknowledgements for each feedback process supported. A second stage may include additional feedback information related to any downlink transmission that was not received successfully and thus included a negative acknowledgement in the first stage. The second stage of feedback information may include additional information about one or more channel characteristics or other information about the component carrier associated with that downlink signal that failed to be decoded. Techniques are also described for compressing or reducing a size of a second stage of feedback information.

In some examples, a UE 115 may receive one or more signals over one or more component carriers (e.g., from a base station 105) and/or in one or more time periods (e.g., slots). Within a first slot, the UE 115 may determine that information included in a signal associated with a first component carrier of the one or more component carriers failed to be successfully decoded. The UE 115 may generate, for a first stage of feedback, an ACK or a NACK associated with each component carrier of the one or more component carriers. The UE 115 may also generate, for a second stage of the feedback, additional feedback information (e.g., information about a channel) associated with the first component carrier (or any other component carrier) that failed to be successfully decoded. In some examples, a combined size of the first and second stages of feedback information exceeds a first limit (which may be referred to as K). In other examples, a size of the second stage of feedback information exceeds a second limit (which may be referred to as L). In some examples, the UE may generate, for the first stage of feedback, an additional set of ACKs or NACKs associated with each component carrier and a second slot. Similarly, the UE may generate, for the second stage of feedback, another set of additional feedback information associated with each component carrier and the second slot.

After determining a size of the feedback information exceeds a limit, the UE 115 may perform a procedure for compressing or reducing a size of the second stage of feedback information. In some examples, the UE 115 may discard a portion of the second stage of feedback information. Additionally, or alternatively, the UE 115 may replace a portion of the second stage of feedback information with different feedback information. In such cases, a size of the replaced portion may be greater than a size of the different feedback information.

Figure 2:
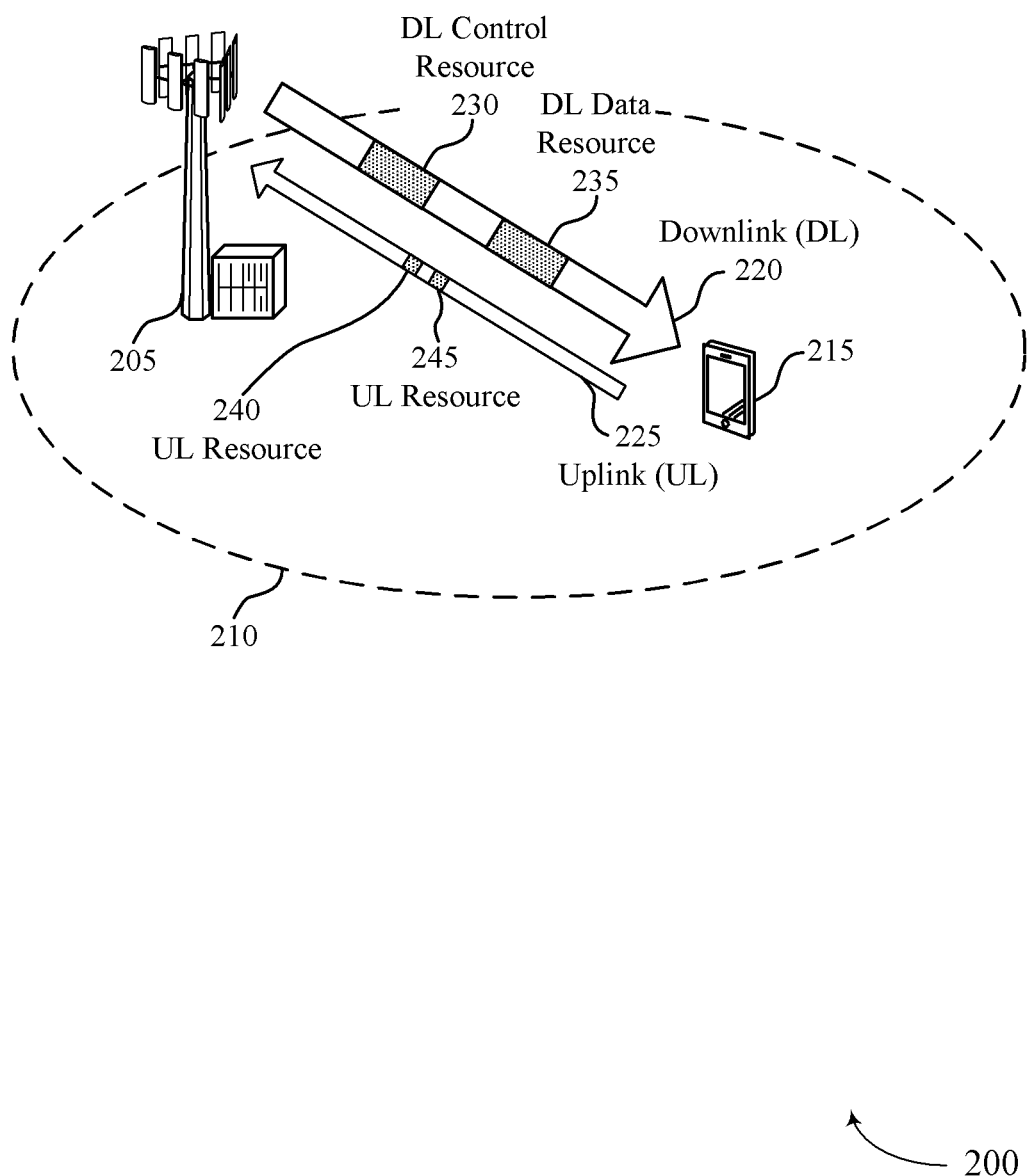
FIG. 2 illustrates an example of a wireless communications system that supports two-stage feedback procedures in accordance with aspects of the present disclosure.

FIG. 2 illustrates an example of a wireless communications system 200 that supports two-stage feedback procedures in accordance with aspects of the present disclosure. In some examples, the wireless communications system 200 may implement aspects of the wireless communications system 100.

The wireless communications system 200 may include base station 205 and UE 215 which may be examples of a base station or UE described above with reference to FIG. 1. The base station 205 and the UE 215 may communicate with one another within the coverage area 210 using downlink 220 and uplink 225 and using techniques described above with reference to FIG. 1. The wireless communications system 200 may use enhanced modes for reporting HARQ feedback with channel information. Also, enhanced signaling techniques may be used to support the enhanced reporting modes.

In some examples, the UE 215 may receive a control message (e.g., a downlink control information (DCI) message) transmitted from base station 205 in downlink control resources (e.g., downlink control resource 230). The control message may indicate a location of (e.g., a set of time and frequency resources for) a transport block (or code block group) within downlink data resources (e.g., downlink data resource 235). UE 215 may decode the indicated transport block (or code block group) and may determine whether the transport block (or code block group) has been successfully decoded—e.g., based on a result of a cyclic redundancy check. UE 215 may then generate HARQ feedback based on a result of the decoding. For example, UE 215 may generate an ACK indicator if the transport block (or code block group) is successfully decoded or may generate a NACK indicator if the transport block (or code block group) is not successfully decoded. Some communications may have parameters indicating that the communications are low-latency, high-reliability, or both (e.g., URLLC). In such examples, it may be desirable to reduce a quantity of retransmissions that occur as part of the HARQ process to ensure latency or reliability parameters are satisfied. To that end, feedback information used in a HARQ process may be configured to include ACKs/NACKs and channel information used to adjust one or more parameters associated with the HARQ retransmission of the message. In some cases, the UE 215 receives multiple control messages that indicate a location of multiple transport blocks. The multiple control messages and/or multiple transport blocks may be received over multiple component carriers and/or multiple slots.

A HARQ procedure may support any quantity of HARQ processes for providing HARQ feedback information for any quantity of transport blocks. For example, a single HARQ procedure may include feedback for one, two, three, four, five, or any quantity of HARQ processes. A HARQ process may refer to a process that includes a common HARQ identifier. For an individual HARQ process, a dedicated ACK or NACK may be sent in response to a transmission or retransmission. A UE may aggregate the feedback for a plurality of HARQ identifiers into a common communication. A HARQ procedure may refer to a process that includes the aggregated feedback for the different HARQ identifiers.

Techniques are described for providing additional feedback about a channel (or component carrier) as part of a HARQ feedback procedure. Feedback information associated with a HARQ procedure may include two stages of feedback information. Each stage of feedback information may include a different type of information. In some cases, the terms stage and type may be used interchangeably. A first stage of feedback information may include ACKs or NACKs for each HARQ process or HARQ identifier supported by a HARQ procedure. In some cases, the ACKs or NACKs are generated for corresponding transport blocks transmitted using one or more component carriers and/or slots. In some cases, the ACKs or NACKs are organized so that each ACK or NACK may be associated with a component carrier and/or slot used to transmit the corresponding transport blocks (or code block groups)

A second stage of the feedback information may include additional feedback information related to any downlink information (e.g., transport block or code block group) that was not received successfully and thus associated with a NACK in the first stage of the feedback information. The second stage of feedback information may include additional information about one or more channel characteristics or other information about the component carrier associated with that HARQ identifier that failed to be decoded. The channel information may include channel state information, channel quality information, precoder information, beam refinement information, or a combination thereof.

In some examples, a base station 205 may transmit, using physical downlink control channel (PDCCH) resources (e.g., downlink control resource 230), control data (e.g., downlink control information) that schedules a physical downlink shared channel (PDSCH) resources (e.g., downlink data resource 235). The UE 215 may fail to decode information transmitted over the downlink data resources for a variety of reasons, including that the UE 215 did not detect or successfully decode information included in the downlink control resources, or that the UE 215 did not detect or successfully decode the information included in the downlink data resources after the information included in the downlink control resources was detected or successfully decoded. In some cases, additional feedback information included in the second stage may include an indication of whether the information included in the downlink control resources or the downlink data resources failed to be detected or successfully decoded. The base station 205 may be configured to adjust different parameters based on whether the downlink control resource 230 or the downlink data resource 235 failed to be detected or successfully decoded.

The UE 215 may generate a first stage of feedback based on a success or failure of the UE 215 to decode information transmitted over the downlink control and/or data resources. In some examples, the UE 215 may generate an ACK or NACK indicator for each transport block transmitted in the downlink data resource. The UE 215 may also generate a second stage of feedback based on the success or failure of the UE 215 to decode information transmitted over the downlink control and/or data resources. In some examples, the UE 215 may generate, for each component carrier used to transmit a transport block that was not decoded by the UE 215, an additional set of feedback information about a respective component carrier.

In some examples, after generating the first and second stage of feedback, or while the second stage of feedback is being generated, the UE 215 may determine that a size of the first and second stage of feedback exceeds (or will exceed) an upper limit. In some examples, the UE 215 determines that a combined size of the first and second stage of feedback exceeds a first limit (K). In other examples, the UE 215 determines that a size of the second stage of feedback exceeds a second limit (L). The base station 205 may provide the first and second limit to the UE 215. After determining that the limit is (or will be) exceeded, the UE 215 may perform operations to reduce (or preemptively limit) a size of the second stage of feedback information, as discussed herein.

In some cases, a UE configures a particular mode for reducing the size of the feedback information based on control signaling (e.g., radio resource control (RRC) signaling) received from a base station. For example, the UE may either discard or encode (e.g., compress) information based on the configured mode. In some cases, the base station signals a size of the first upper limit and/or second upper limit. The base station may also signal priority information for the component carriers and/or slots. After reducing the size of the second stage of feedback, the UE 215 may transmit the first stage as part of an uplink resource 240 and may transmit the second stage as part of an uplink resource 245. In some cases, the uplink resource 240 and the uplink resource 245 may be conveyed using adjacent time resources, adjacent frequency resources, or both. In such cases, the uplink resource 240 and the uplink resource 245 may be considered to be a same uplink resource.

After receiving the first stage of feedback information and the second stage of feedback information over one or more uplink resources, the base station 205 may adapt transmission parameters based on the indicated channel information. The base station 205 may also transmit subsequent communications (e.g., a transmission carrying new or redundant data) to the UE 215 using the adapted transmission parameters. By adapting the transmission parameters, the base station 205 may increase the likelihood of success for the subsequent transmission to the UE 215, increasing a reliability of the wireless communications system. Adapting the transmission parameters may also decrease the amount of performed retransmissions that occur before the UE 215 successfully receives downlink data, reducing latency for communications to the UE 215 and/or increasing throughput for the wireless communication system.

Figure 3:
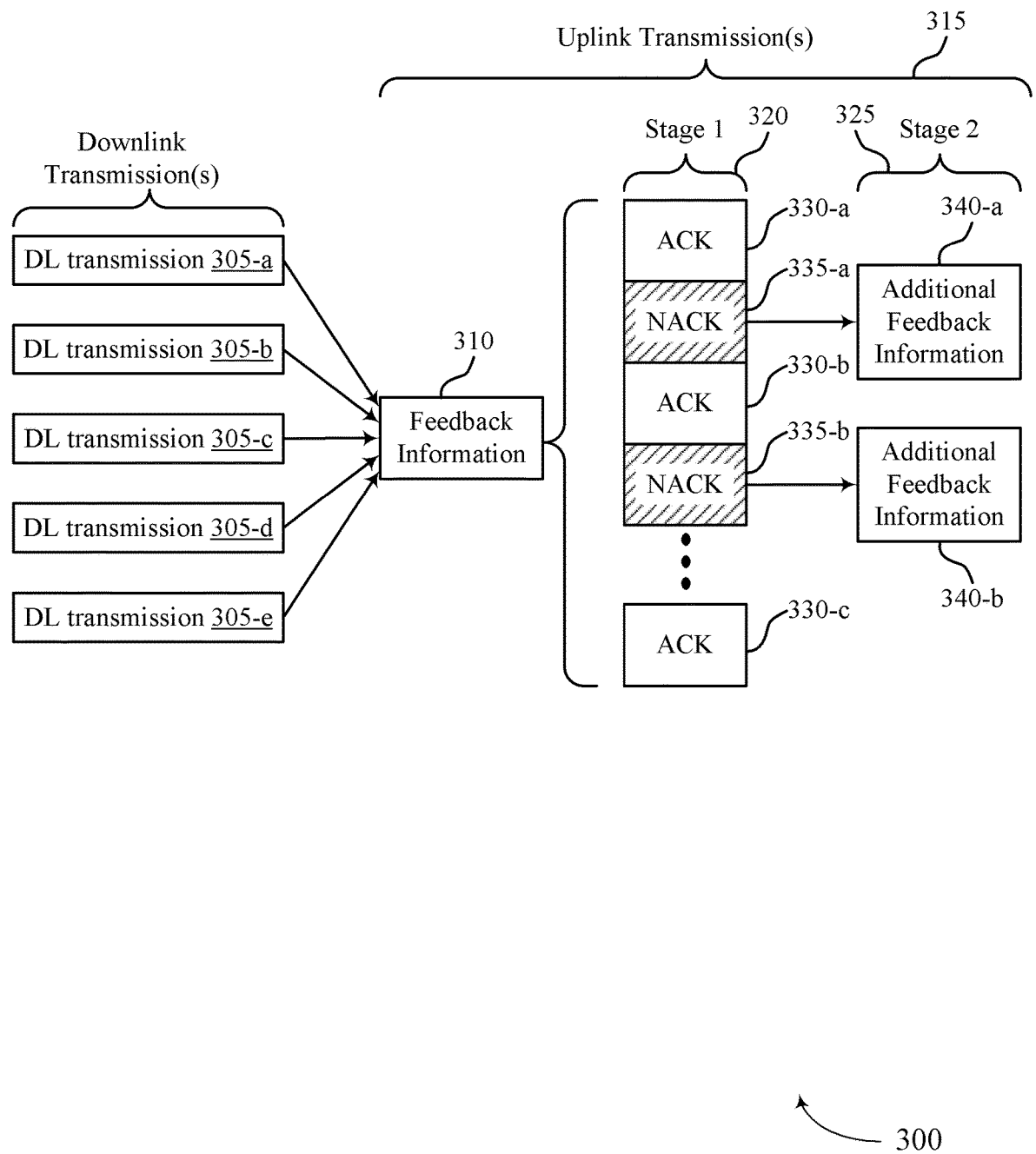
FIG. 3 illustrates an example of a communication diagram that supports two-stage feedback procedures in accordance with aspects of the present disclosure.

FIG. 3 illustrates an example of a communication diagram 300 that supports two-stage feedback procedures in accordance with aspects of the present disclosure. In some examples, the communication diagram 300 may implement aspects of wireless communications systems 100 or 200.

The communication diagram 300 illustrates various aspects of the two-stage procedure for providing HARQ feedback. By providing additional feedback information as part of the second stage of the feedback with the NACKs of the HARQ feedback, a base station may be enabled to use one or more different transmission parameters for the retransmission, such as a different modulation and coding scheme (MCS), a different resource allocation, a different transmission beam, or any combination thereof. The additional information may include a downlink control information miss detection (DTX) indicator, channel state information (CSI), channel quality information (CQI), precoder information, beam refinement information, or a combination thereof. In some cases, additional information may include a DTX indicator, CQI about the channel for which the communication failed, or a combination thereof.

The communication diagram 300 illustrates one or more downlink transmissions 305 communicated by a base station to a UE. The downlink transmissions 305 may include any quantity of transmissions (e.g., one, two, three, four, five, six, seven, eight, etc.). Each downlink transmission 305 may be associated with a HARQ process or a HARQ identifier such that an ACK or NACK is provided for each transmission as part of the first stage of the feedback information. A downlink transmission 305 may be an example of one or more signals communicated over one or more component carriers, one or more slots, one or more transport blocks, one or more code block groups, information communicated over a set of control resources (e.g., DCI or PDCCH), information communicated over a set of data resources (e.g., PDSCH), or a combination thereof.

After receiving one or more downlink transmissions 305, the UE may generate and provide feedback information 310 conveyed using one or more uplink transmissions 315. The feedback information 310 may include a first stage 320 of feedback information and a second stage 325 of feedback information. The first stage 320 of feedback information may include an ACK 330 or a NACK 335 for each downlink transmission 305 that is part of the HARQ procedure. For example, if a UE receives five downlink transmissions (e.g., a first downlink transmission 305-a, a second downlink transmission 305-b, a third downlink transmission 305-c, a fourth downlink transmission 305-d, and a fifth downlink transmission 305-e), the UE may generate feedback information 310 (e.g., HARQ feedback information) for each downlink transmission. The second stage 325 may include additional feedback information 340 associated with each downlink transmission 305 that is associated with a NACK 335. For example, if a UE fails to decode two downlink transmissions (e.g., a second downlink transmission 305-b and a fourth downlink transmission 305-d), the UE may generate additional feedback information 340 (e.g., DTX and/or channel information) for the failed downlink transmissions.

In some examples, the UE may generate a first ACK 330-a for the first downlink transmission 305-a, a first NACK 335-a for the second downlink transmission 305-b, a second ACK 330-b for the third downlink transmission 305-c, a second NACK 335-b for the fourth downlink transmission 305-d, and a third ACK 330-c for the fifth downlink transmission 305-e. The UE may communicate the ACKs 330 and the NACKs 335 as part of the first stage 320 of feedback information. The UE may also generate additional feedback information 340 for each of the downlink transmissions 305 associated with a NACK 335-a (e.g., additional feedback information 340-a for the second downlink transmission 305-b and additional feedback information 340-b for the fourth downlink transmission 305-d). The UE may communicate the additional feedback information 340-a and 340-b as part of the second stage 325 of feedback information.

In some cases, the additional feedback information 340 may include either a DTX indicator or channel information (e.g., CQI) for a NACK 335 associated with a downlink transmission 305 (e.g., a transport block or code block group). In such cases, the additional feedback information 340 may be one or more bits. For example, the additional feedback information 340 may include the first indicator that indicates whether downlink control information for the downlink transmission failed to be detected (e.g., the DTX indicator) or the second indicator that indicates channel information about a physical downlink shared channel of the downlink transmission (e.g., CQI).

After receiving the downlink transmissions 305, the UE may determine that downlink control information for the downlink transmissions 305 (e.g., component carrier) failed to be detected. In such examples, the additional feedback information 340 may include an indication that downlink control information for a first component carrier and/or a second component carrier failed to be detected (e.g., the DTX indicator). The downlink control information may be part of a physical downlink control channel of the downlink transmission 305 (e.g., component carrier). Upon receiving the additional feedback information 340, the base station may identify the indication that downlink control information for the first component carrier and/or second component carrier failed to be detected and the base station may adjust one or more transmission parameters of a physical downlink control channel associated with the downlink transmissions 305 based on identifying the indication. Examples of transmission parameters that the base station may adjust for the PDCCH may include transmission beam, a transmission configuration indication (TCI) indicator, a transmission power, or a combination thereof. In cases were the PDCCH failed to be detected, the base station may treat the retransmission of the PDSCH as if it is an initial transmission by setting the redundancy version index (RVID) to zero (0) and toggling the new data indicator (NDI) to indicate it is a new transport block.

After receiving the downlink transmissions 305, the UE may determine that a physical downlink shared channel of one or more component carriers failed to be successfully decoded. In such examples, the additional feedback information 340 may include an indication of channel information associated with the physical downlink shared channel of a first component carrier and/or an indication of channel information associated with the physical downlink shared channel of the second component carrier. Upon receiving the additional feedback information 340, the base station may identify the indication of channel information associated with a first physical downlink shared channel and/or a second physical downlink shared channel, and the base station may adjust one or more transmission parameters of the first and second physical downlink shared channels based on identifying the indication. Examples of transmission parameters that the base station may adjust for the PDSCH may include a transmission beam, a quasi-colocation (QCL) indicator, a transmission power, or a combination thereof. In cases were the PDSCH failed to be decoded, the base station may set the RVID to a non-zero (e.g., RVID=2) and may toggle the NDI to indicate the PDSCH is not a new transport block.

In some cases, the additional feedback information 340 may include a DTX indicator and channel information (e.g., CQI) for a NACK 335 associated with a downlink transmission 305 (e.g., a transport block or code block group). The additional feedback information 340 may be two or more bits. In some examples, a first portion of the additional feedback information 340 (e.g., one or more bits) may be an example of a first indicator that indicates whether downlink control information for the downlink transmission 305 failed to be detected (e.g., the DTX indicator). In some examples, a second portion of the additional feedback information 340 (e.g., one or more bits) may be an example of a second indicator that indicates channel information about a physical downlink shared channel of the downlink transmission (e.g., CQI). In some cases, the channel information includes channel state information, channel quality information, precoder information, beam refinement information, or a combination thereof. In some examples, the two or more indicators included in the additional feedback information 340 may be separately encoded such that one or more bits are dedicated to one indicator and one or more other bits are dedicated to another indicator. In some examples, the two or more indicators may be jointly encoded. Table 1, provided below, illustrates a joint encoding scheme for the additional feedback information 340.

codebook), and the size of the first stage 320 may be indicated by a downlink assignment index (DAI) field in the DL DCI.

When determining a size of the second stage 325, the base station and/or UE may determine the size as N*M, where N is the number of NACKs in first stage 320 and M is an RRC configurable bit width for the additional feedback information 340 associated with NACK. In some examples, M may equal one bit or may equal two bits, as in the jointly encoded

TABLE 1

| Bit value | Information conveyed by bit value |
| --- | --- |
| 00 | DTX Indicator. The UE may fail to detect the DCI scheduling the PDSCH of the downlink transmission. In this case, the channel information associated with the PDSCH is not included because UE may not be able to identify the PDSCH after failing to detect the DCI. |
| 01 | CQI update/refinement. The UE may determine that the PDSCH failed to be decoded with a marginal logarithm of likelihood ratio (LLR). This bit value may indicate that a retransmission may pass with the same MCS (e.g., X = 0). |
| 10 | CQI update/refinement. The UE may determine that the PDSCH failed to be decoded with a medium-to-low LLR. This bit value may indicate that a retransmission may pass with a lower MCS (e.g., Y = 2). |
| 11 | CQI update/refinement. The UE may determine that the PDSCH failed to be decoded with a low LLR. This bit value may indicate that a retransmission may pass with a significantly lower MCS (e.g., Z = 4). |

Table 1 illustrates an example of an encoding scheme. Other encoding schemes are within the scope of this disclosure. The base station functionality and the UE functionality for handling the additional feedback information may be applied with any combination of indicators included in the additional feedback information 340.

The base station and/or the UE may determine a total size of the feedback information 310, a size of the first stage 320, a size of the second stage 325 or any combination thereof. For example, the base station or the UE may identify a first size (e.g., a bit size or a quantity of bits) of the first stage 320 based on a first quantity of physical downlink shared channels scheduled on the one or more downlink transmissions 305. The base station or the UE may also identify a second size (e.g., a bit size or a quantity of bits) of the second stage 325 based at least in part on a second quantity of NACKs included in the first stage 320 and a bit width for the additional feedback information 340. The base station or the UE may identify the size of the first stage 320 based on a quantity of ACKs/NACKs to be included in the HARQ procedure—e.g., based on a number of component carriers and slots used to transmit a first set of downlink transmissions.

In some examples, a size of the first stage 320 may be based on a codebook size. In some instances, the first stage 320 may utilize a HARQ-ACK codebook as defined in a technical specification or standard. In some cases, the size of the HARQ-ACK codebook is based on a number of activated component carriers and/or a selected number of slots—e.g., a HARQ-ACK codebook that encompasses five (5) component carriers and two (2) slots may include 10 bits. In some cases, the codebook may be a type one (semi-static codebook), and the size of the first stage 320 may be configured by one or more downlink control messages. The downlink control message may be an example of an RRC message or RRC signaling. The downlink control message may include an indicator in the downlink control information for the first downlink channel indicates whether feedback for the first downlink channel includes the second stage. In some cases, the codebook is type two (dynamic example described with reference to Table 1. The size of the second stage 325 may depend on the payload in the first stage 320. The base station may decode the information in the first stage 320 before it can determine a size of the second stage 325. Similarly, the UE may generate the information for the first stage 320 before it can determine a size or content of the second stage 325. For example, the size of the first stage 320 may depend on how many PDSCHs are scheduled on the component carriers associated with the HARQ procedure, and the size may range from zero (0) to five (5) bits. If the bit width of the second stage 325 is two bits, the size of the second stage 325 may range between zero (0) and ten (10) bits depending the quantity of NACKs in the first stage 320. The total size of the feedback information 310 may range between zero (0) and fifteen (15) bits in this example. Techniques for reducing (or limiting) a size of the second stage 325 are described herein.

To reduce a number of resources allocated to a UE for reporting the feedback information 310, a variety of techniques may be employed to limit a size of the variable-sized second stage 325. In a first option for limiting the size of the second stage 325, a single physical uplink control channel (PUCCH) resource for both the first stage 320 and the second stage 325 and an upper bound (K) for the total size of the feedback information 310 may be used. For example, the first stage 320 and the second stage 325 may be communicated using a single PUCCH resource that may include a first set of uplink resources for the first stage 320 and a second set of uplink resources for the second stage 325.

The base station or the UE may identify an upper limit for a total size of the feedback information 310. The upper limit may be communicated using control signaling (e.g., DCI or RRC signaling). The upper limit may be stored in the base station and UE and known beforehand (e.g., preconfigured). The first stage 320 and the second stage 325 may be jointly encoded or may be separately encoded. In some examples, when the base station or the UE select resources (e.g., resource blocks) to transmit the feedback information 310 in the PUCCH resource, the base station or UE may use the upper limit rather than the actual size of the feedback information. For example, if the upper limit is seven (7) bits and the actual size of the feedback information 310 is five (5) bits, the base station or UE may use the seven (7) bit value to determine the resources to use for the feedback information 310.

In some cases, if the size of the feedback information 310 exceeds the upper limit, the additional feedback information 340 of the second stage 325 may be reduced (or limited or compressed) by the UE. In some cases, if the size of the feedback information 310 equals or is below the upper limit, one or more bits may be appended to the feedback information 310 (e.g., appended to the second stage 325) to bring the feedback information 310 to the upper limit size. To make these determinations, the base station or the UE may identify the total size of the feedback information 310 and compare that to the upper limit.

In a second option for limiting the size of the second stage 325, a signal PUCCH resource with an upper limit (L) for the size of the second stage 325 may be used. For example, the first stage 320 and the second stage 325 may be communicated using a single PUCCH resource that may include the first set of uplink resources and the second set of uplink resources.

The base station or the UE may identify an upper limit for a size of the additional feedback information 340 of the second stage 325. The upper limit may be communicated using control signaling (e.g., DCI or RRC signaling). The upper limit may be stored in the base station and UE and known beforehand. The first stage 320 and the second stage 325 may be jointly encoded or may be separately encoded. In some examples, when the base station or the UE select resources (e.g., resource blocks) to transmit the feedback information 310 in the PUCCH resource, the base station or UE may use the upper limit rather than the actual size of the additional feedback information 340 of the second stage 325. For example, if the upper limit of the second stage 325 is four (4) bits and the actual size of the additional feedback information 340 of the second stage 325 is two (2) bits, the base station or UE may use the four (4) bit value to determine the resources to use for the feedback information 310.

In some cases, if the size of the additional feedback information 340 of the second stage 325 exceeds the upper limit, the first stage 320 may be fully communicated and a size of the additional feedback information 340 may be reduced (or limited) by the UE. In some cases, if the size of the additional feedback information 340 of the second stage 325 equals or is below the upper limit, one or more bits may be appended to the additional feedback information 340 to bring the additional feedback information 340 to the upper limit size. To make these determinations, the base station or the UE may identify the size of the additional feedback information 340 of the second stage 325 and compare that to the upper limit.

In examples where the first stage 320 and the second stage 325 are separately encoded, the resource partition between first stage 320 and the second stage 325 may be determined at a resource block level, a resource element level, or a symbol level (e.g., an OFDM symbol level). For example, the first set of uplink resources associated with the first stage 320 may include a first resource block and the second set of uplink resources associated with the second stage 325 may include a second resource block different than the first resource block. In examples where the first stage 320 and the second stage 325 are jointly encoded, dummy bits may be added to the additional feedback information 340 if the total size of the additional feedback information 340 does not meet or exceed the upper limit.

A specific example of the first option for limiting the size of the second stage 325 is provided. In an example where the first stage 320 may include up to five (5) bits of ACK/NACK information and the bit width of the second stage 325 is two (2) bits, the total size of the second stage 325 may be up to ten (10) bits and the total size of the feedback information 310 may be up to fifteen (15) bits. In some cases, the upper limit (K) for the first stage 320 and second stage 325 may be set at nine (9) bits. With such limitations, the total size of the feedback information 310 may be determined to be K bits. Suppose that the first stage 320 is three (3) bits, the second stage 325 is two (2) bits, and the PUCCH resource selected for communicating the feedback information 310 has nine (9) resource blocks (based on the value of K). Based on the coding rate of the PUCCH resource, three (3) resource blocks may be assigned to the first stage 320, leaving six (6) resource blocks for the second stage 325, where four (4) of the six (6) resource blocks may be unused.

A specific example of the second option for limiting the size of the second stage 325 is also provided. In an example where the first stage 320 may include up to five (5) bits of ACK/NACK information and the bit width of the second stage 325 is two (2) bits, the total size of the second stage 325 may be up to ten (10) bits and the total size of the feedback information 310 may be up to fifteen (15) bits. In some cases, the upper limit (L) for the second stage 325 may be set at four (4) bits. With such limitations, the total size of the feedback information 310 may be determined to be a summation of the size of the first stage 320 (e.g., a bit value between zero (0) and five (5)) and L bits. Suppose that the first stage 320 is three (3) bits, the second stage 325 is two (2) bits, and the PUCCH resource selected for communicating the feedback information 310 has seven (7) resource blocks (based on the three (3) bits of the first stage plus the value of L). Based on the coding rate of the PUCCH resource, three (3) resource blocks may be assigned to the first stage 320, leaving four (4) resource blocks for the second stage 325, where two (2) of the four (4) resource blocks may be unused. Thus, relative to the first option, fewer unused resource blocks may occur when the second option is used to manage the size of the feedback information 310.

Regardless of whether the first or second option for utilizing the set of resources for reporting the feedback information 310 is used, the UE may reduce (or limit) a size of the second stage 325 based on determining that one of the first or second upper limit is exceeded—e.g., based on which of the options is being utilized. In some examples, the UE may generate the additional feedback information 340 in accordance with a procedure for reducing a size of the additional feedback information 340. That is, the UE may generate the second stage 325 of feedback information and then perform operations for reducing a size of the second stage 325 of feedback information after determining a size of the first stage 320 and second stage 325 exceeds a limit. In some examples, the UE may determine portions of the second stage 325 to discard or compress in accordance with priority information. For example, the UE may reduce additional feedback information 340 that is associated with a lower priority component carrier and/or slot before reducing additional feedback information 340 that is associated with a higher priority component carrier and/or slot. In such cases, if additional feedback information 340-a is associated with a lower priority than additional feedback information 340-b, then the UE may reduce additional feedback information 340-a before reducing additional feedback information 340-b. In some cases, the UE may refrain from reducing additional feedback information 340-*b* after additional feedback information 340-*a* is reduced—e.g., based on determining that a size of the second stage 325 of feedback information has reached an upper limit after reducing additional feedback information 340-*a*.

In other examples, the UE may generate the additional feedback information 340 in accordance with a procedure for limiting a size of the additional feedback information 340. That is, the UE may generate the second stage 325 of feedback information in accordance with operations for ensuring that a size of the first stage 320 and second stage 325 are within a limit. In some examples, the UE may generate the additional feedback information 340 in accordance with priority information. For example, the UE may generate additional feedback information 340 that is associated with a higher priority component carrier and/or slot before generating additional feedback information 340 that is associated with a lower priority component carrier and/or slot. In such cases, if additional feedback information 340-*a* is associated with a lower priority than additional feedback information 340-*b*, then the UE may generate additional feedback information 340-*b* before generating additional feedback information 340-*a*. In some cases, the UE may refrain from generating additional feedback information 340-*a* after additional feedback information 340-*b* is generated—e.g., based on determining that a size of the second stage 325 of feedback information has reached an upper limit or that generating additional feedback information 340-*a* would case the size of the second stage 325 of feedback information to exceed the upper limit.

Figure 4:
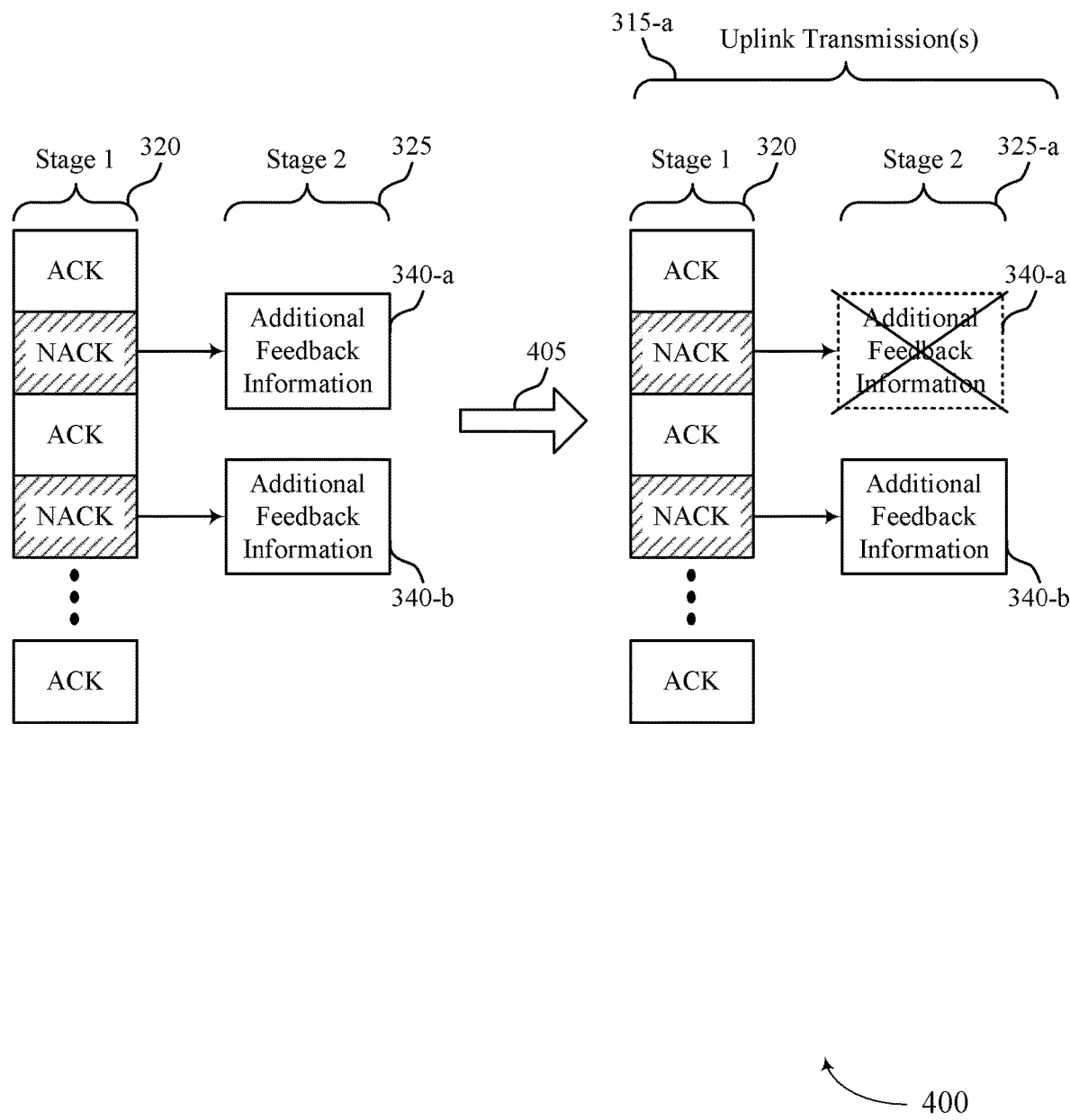
FIG. 4 through 7 illustrate examples of communication diagrams that support two-stage feedback procedures in accordance with aspects of the present disclosure.

FIG. 4 illustrates an example of a communication diagram 400 that supports two-stage feedback procedures in accordance with aspects of the present disclosure. In some examples, the communication diagram 400 may implement aspects of wireless communications systems 100 or 200.

The communication diagram 400 may include the first stage 320 of feedback information and the second stage 325 of feedback information described in FIG. 3. The communication diagram 400 may also depict a procedure for reducing a size of the second stage 325 of feedback information by discarding a portion of the second stage 325.

In some cases, additional feedback information 340-*a* and additional feedback information 340-*b* may carry information in accordance with Table 1. That is, a value of additional feedback information 340-*a* or additional feedback information 340-*b* may correspond to a scheme that jointly encodes DTX information and channel information.

In some examples, a UE may determine that a combined size of the first stage 320 of feedback information and the second stage 325 of feedback information exceeds a total upper limit. In other examples, the UE may determine that size of the second stage 325 of feedback information exceeds a second upper limit. After determining that an upper limit is exceeded, the UE may discard a portion of the second stage 325 of feedback information to fit within resources allocated for transmitting the feedback information.

In some examples, the UE determines which portion of the second stage 325 to discard based on priority information associated with the different sets of additional feedback information 340. The priority information may include an indication of priority levels for component carriers used to transmit downlink information to the UE. In some examples, the priority information indicates that component carriers assigned higher indices have higher priorities than component carriers assigned lower indices, or vice versa. In some examples, the priority information indicates that component carriers that are used to carry certain data (e.g., high priority data or URLLC) have higher priorities than component carriers that are to carry other data (e.g., lower priority data). The priority information may also include an indication of priority levels for one or more slots used to transmit downlink information to the UE. In some cases, the priority information indicates that slots that occur later in time have higher priorities than slots that occur earlier in time, or vice versa. In some cases, a priority of a slot may supersede a priority of a component carrier. For example, additional feedback information 340 that is associated with a slot and a component carrier having a first index may have a higher priority than additional feedback information 340 that is associated with an earlier slot and another component carrier that has a higher priority than the first component carrier.

In some examples, the UE may receive priority information indicating that additional feedback information 340-*b* has a higher priority level than additional feedback information 340-*a*. After determining that an upper limit for reporting feedback information is exceeded, the UE may discard additional feedback information 340-*a* based on the received priority information.

In some examples, a UE may determine that a size of the first stage 320 of feedback information and the second stage 325 of feedback information will exceed an upper limit—e.g., by multiplying the number of NACKs by a bit width for the second stage 325. In such cases, the UE may generate the second stage 325-*a* of feedback information in accordance with priority information obtained by the UE. In some examples, the UE may receive priority information indicating that additional feedback information 340-*b* has a higher priority level than additional feedback information 340-*a*. In some examples, after determining that an upper limit for reporting feedback information will be exceeded by the generation of additional feedback information 340-*a*, the UE may refrain from generating additional feedback information 340-*a* based on the priority information.

Thus, the second stage 325-*a* of feedback may be obtained, where the second stage 325-*a* may be a modified (e.g., reduced) version of the second stage 325. The UE may transmit the first stage 320 and the second stage 325-*a* of feedback information in uplink transmission 315-*a* to a base station. Arrow 405 may represent a modification of the second stage 325 to the modified second stage 325-*a*.

In some cases, a base station that receives uplink transmission 315-*a* may determine that additional feedback information 340-*a* was discarded—e.g., based on a number of NACKs received in the first stage 320, an upper limit for reporting the feedback information, priority information for the different component carriers and/or slots associated with the sets of additional feedback information 340, or any combination thereof. In some cases, the base station further determines that additional feedback information 340-*a* was discarded based on determining that the UE is configured in a mode associated with reducing a size of feedback information by discarding a portion of the second stage 325 of feedback information in accordance with priority information.

The operations described above may be more generally applied to an increased number of sets of additional feedback information 340. That is, in some examples for reducing a size of the second stage 325, one or more sets of additional feedback information 340 may be discarded in accordance with priority information until a size of the second stage 325 equals or is below the upper limit for the feedback information.

Figure 5:
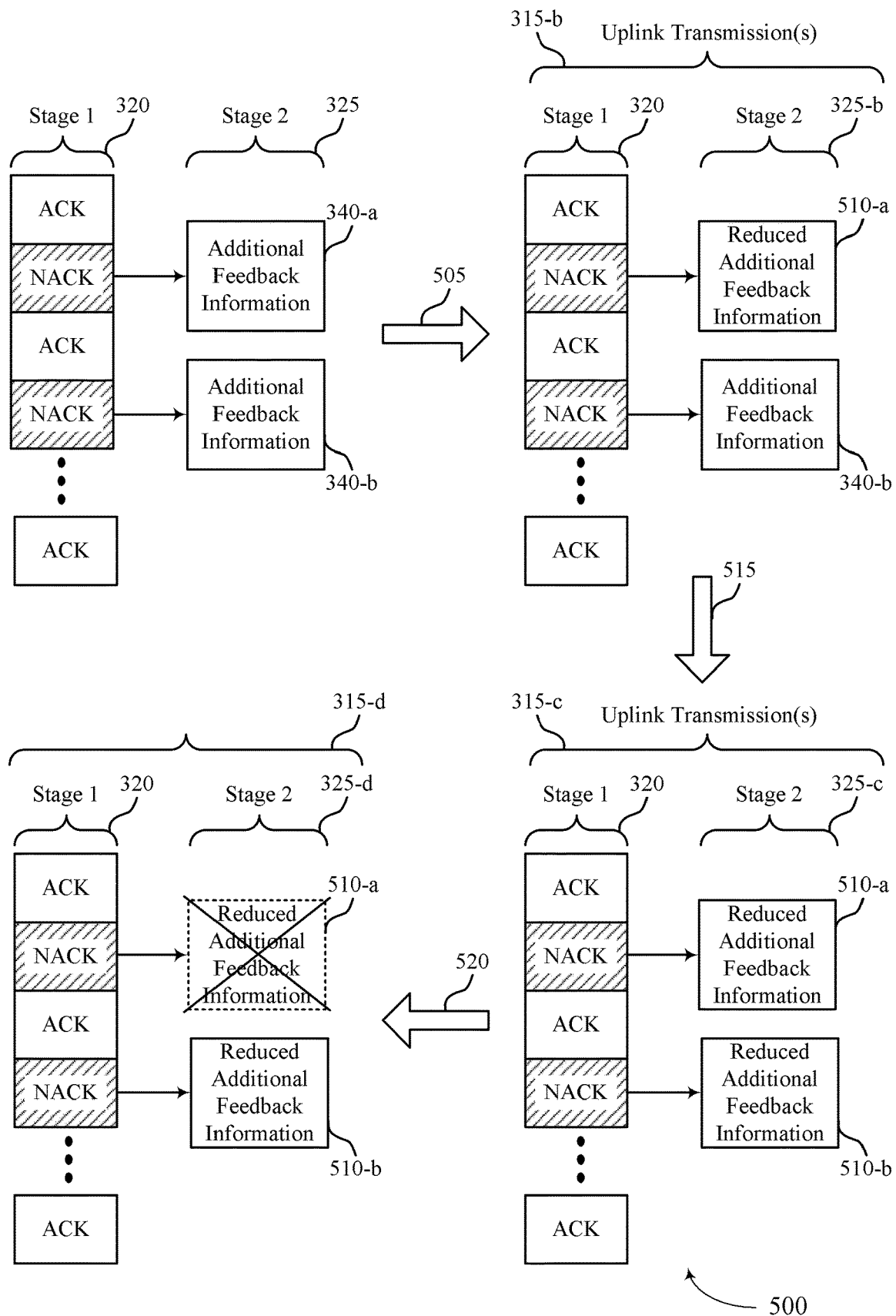

FIG. 5 illustrates an example of a communication diagram 500 that supports two-stage feedback procedures in accordance with aspects of the present disclosure. In some examples, the communication diagram 500 may implement aspects of wireless communications systems 100 or 200.

The communication diagram 500 may include the first stage 320 of feedback information and the second stage 325 of feedback information described in FIG. 3. The communication diagram 500 may also depict a procedure for reducing a size of the second stage 325 of feedback information by discarding a portion of the second stage 325 and/or replacing the portion of the second stage 325 with different feedback information having a smaller size.

In some cases, additional feedback information 340-*a* and additional feedback information 340-*b* may carry information in accordance with Table 1. That is, a value of additional feedback information 340-*a* or additional feedback information 340-*b* may correspond to a scheme that jointly encodes DTX information and channel information.

In some examples, a UE may determine that a combined size of the first stage 320 of feedback information and the second stage 325 of feedback information exceeds a total upper limit. In other examples, the UE may determine that a size of the second stage 325 of feedback information exceeds a second upper limit. After determining that the upper limit is exceeded, the UE may discard one or more portions of the second stage 325 and may replace the one or more discarded portion with reduced additional feedback information 510 to fit within resources allocated for transmitting the feedback information.

In some cases, the reduced additional feedback information 510 may be generated based on discarding the channel information used to generate the additional feedback information 340. That is, the reduced additional feedback information 510 may be generated by separately encoding DTX information after the channel information is discarded. Table 2, provided below, illustrates a separate encoding scheme for the additional feedback information 340.

In some examples, the UE determines which portion of the second stage 325 to discard based on priority information associated with the different sets of additional feedback information 340. The priority information may include an indication of priority levels for component carriers used to transmit downlink information to the UE. In some examples, the priority information indicates that component carriers assigned higher indices have higher priorities than component carriers assigned lower indices, or vice versa. In some examples, the priority information indicates that component carriers that are used to carry certain data (e.g., high priority data or URLLC) have higher priorities than component carriers that are to carry other data (e.g., lower priority data). The priority information may also include an indication of priority levels for one or more slots used to transmit downlink information to the UE. In some cases, the priority information indicates that slots that occur later in time have higher priorities than slots that occur earlier in time, or vice versa. In some examples, additional feedback information 340 that is associated with a slot and a component carrier having a first index may have a higher priority than additional feedback information 340 that is associated with an earlier slot and another component carrier that has a higher priority than the component carrier.

In some examples, the UE may receive priority information indicating that additional feedback information 340-*b* has a higher priority level than additional feedback information 340-*a*. After determining that an upper limit for reporting feedback information is exceeded, the UE may discard additional feedback information 340-*a* based on the priority information and replace the additional feedback information 340-*a* with reduced additional feedback information 510-*a*. Reduced additional feedback information 510-*a* may be generated based on additional feedback information 340-*a* but may convey less information than additional feedback information 340-*a*.

In some examples, a UE may determine that a size of the first stage 320 of feedback information and the second stage

TABLE 2

| Bit value | Information conveyed by bit value |
| --- | --- |
| 0 | DTX Indicator. The UE may fail to detect the DCI scheduling the PDSCH of the downlink transmission. In this case, the channel information associated with the PDSCH is not included because UE may not be able to identify the PDSCH after failing to detect the DCI. |
| 1 | NACK. |

In some cases, the reduced additional feedback information 510 may be generated based on jointly encoding the channel information and DTX information into a smaller number of bits—e.g., relative to Table 1. Table 3, provided below, illustrates a reduced encoding scheme for the additional feedback information 340.

325 of feedback information will exceed an upper limit— e.g., by multiplying the number of NACKs by a bit width for the second stage 325. In such cases, the UE may generate the second stage 325-*a* of feedback information in accordance with priority information obtained by the UE. In some examples, the UE may receive priority information indicat-

TABLE 3

| Bit value | Information conveyed by bit value |
| --- | --- |
| 0 | DTX Indicator. The UE may fail to detect the DCI scheduling the PDSCH of the downlink transmission. In this case, the channel information associated with the PDSCH is not included because UE may not be able to identify the PDSCH after failing to detect the DCI. |
| 1 | CQI update/refinement. The UE may determine that the PDSCH failed to be decoded with a medium-to-low logarithm of likelihood ratio (LLR). This bit value may indicate that a retransmission may pass with a lower MCS (e.g., L = 3). | ing that additional feedback information 340-*b* has a higher priority level than additional feedback information 340-*a*. In some examples, after determining an upper limit for reporting feedback information will be exceeded by the generation of additional feedback information 340-*a*, the UE may refrain from generating additional feedback information 340-*a* and instead generate reduced additional feedback information 510-*a* based on the priority information.

Thus, the second stage 325-*b* of feedback may be obtained, where the second stage 325-*b* may be a modified (e.g., reduced) version of the second stage 325. The UE may transmit the first stage 320 and the second stage 325-*b* of feedback information in uplink transmission 315-*b* to a base station. Arrow 505 may represent a modification of the second stage 325 to the modified second stage 325-*b*.

In some cases, a base station that receives uplink transmission 315-*b* may determine that additional feedback information 340-*a* was discarded and replaced with reduced additional feedback information 510-*a*—e.g., based on a number of NACKs received in the first stage 320, an upper limit for reporting the feedback information, and priority information for the different component carriers and/or slots associated with the sets of additional feedback information 340. In some cases, the base station further determines that additional feedback information 340-*a* was replaced with a reduced additional feedback information 510-*a* based on determining the UE is configured in a mode associated with reducing a size of feedback information by replacing portions of the second stage 325 of feedback information with reduced sets of feedback information in accordance with priority information.

In some examples, a UE may determine that an upper limit is (or will be) exceeded by a size of the first stage 320 of feedback information and the second stage 325-*b* of feedback information. After determining that an upper limit for reporting feedback information is (or will be) exceeded, the UE may discard additional feedback information 340-*b* based on the priority information and replace additional feedback information 340-*b* with reduced additional feedback information 510-*b*. In some examples, the UE may generate reduced additional feedback information 510-*b* instead of additional feedback information 340-*b* based on determining that the upper limit will be exceeded if the second stage 325-*b* includes reduced additional feedback information 510-*a* and additional feedback information 340-*b*.

Thus, the second stage 325-*c* of feedback may be obtained, where the second stage 325-*c* may be a modified (e.g., reduced) version of the second stage 325-*b*. The UE may transmit the first stage 320 and the second stage 325-*c* of feedback information in uplink transmission 315-*c* to a base station. Arrow 515 may represent a modification of the second stage 325-*b* to the modified second stage 325-*c*.

In some cases, a base station that receives uplink transmission 315-*c* may determine that additional feedback information 340-*a* and additional feedback information 340-*b* were discarded and replaced with reduced additional feedback information 510-*a* and reduced additional feedback information 510-*b*—e.g., based on a number of NACKs received in the first stage 320, an upper limit for reporting the feedback information, and priority information for the different component carriers and/or slots associated with the sets of additional feedback information 340. In some cases, the base station further determines that additional feedback information 340-*a* and additional feedback information 340-*b* were replaced with reduced additional feedback information 510-*a* and reduced additional feedback information 510-*b* based on determining that the UE is configured in a mode associated with reducing a size of feedback information by replacing portions of the second stage 325 of feedback information with reduced sets of feedback information in accordance with priority information.

In some examples, a UE may determine that an upper limit is (or will be) exceeded by a size of the first stage 320 of feedback information and the second stage 325-*c* of feedback information. After determining that an upper limit for reporting feedback information is (or will be) exceeded, the UE may discard reduced additional feedback information 510-*a* based on the priority information. Thus, the information associated with additional feedback information 340-*a* may be completely discarded from the second stage 325-*d*. In some examples, the UE may refrain from generating additional feedback information 340-*a* and reduced additional feedback information 510-*a* based on determining that the upper limit will be exceeded if the second stage 325-*d* includes reduced additional feedback information 510-*a* and reduced additional feedback information 510-*b*.

Thus, the second stage 325-*d* of feedback may be obtained, where the second stage 325-*d* may be a modified (e.g., reduced) version of the second stage 325-*c*. The UE may transmit the first stage 320 and the second stage 325-*d* of feedback information in uplink transmission 315-*d* to a base station. Arrow 520 may represent a modification of the second stage 325-*c* to the modified second stage 325-*d*.

In some cases, a base station that receives uplink transmission 315-*d* may determine that additional feedback information 340-*a* was discarded and that additional feedback information 340-*b* was discarded and replaced with reduced additional feedback information 510-*b*—e.g., based on a number of NACKs received in the first stage 320, an upper limit for reporting the feedback information, and priority information for the different component carriers and/or slots associated with the sets of additional feedback information 340. In some cases, the base station further additional feedback information 340-*b* was discarded and that additional feedback information 340-*b* was discarded and replaced with reduced additional feedback information 510-*b* based on determining that the UE is configured in a mode associated with reducing a size of feedback information by replacing portions of the second stage 325 of feedback information with reduced sets of feedback information in accordance with priority information.

The operations described above may be more generally applied to an increased number of sets of additional feedback information 340. That is, in some examples for reducing a size of the second stage 325, in a first set of operations, each set of additional feedback information 340 may be replaced by a set of reduced additional feedback information 510 in accordance with priority information until a size of the feedback information equals or is below the upper limit. And, if the size of the feedback information exceeds the upper limit after the first set of operations is completed, each set of reduced additional feedback information 510 may be discarded in accordance with the priority information in a second set of operations until the size of the feedback information is below the upper limit.

Figure 6:
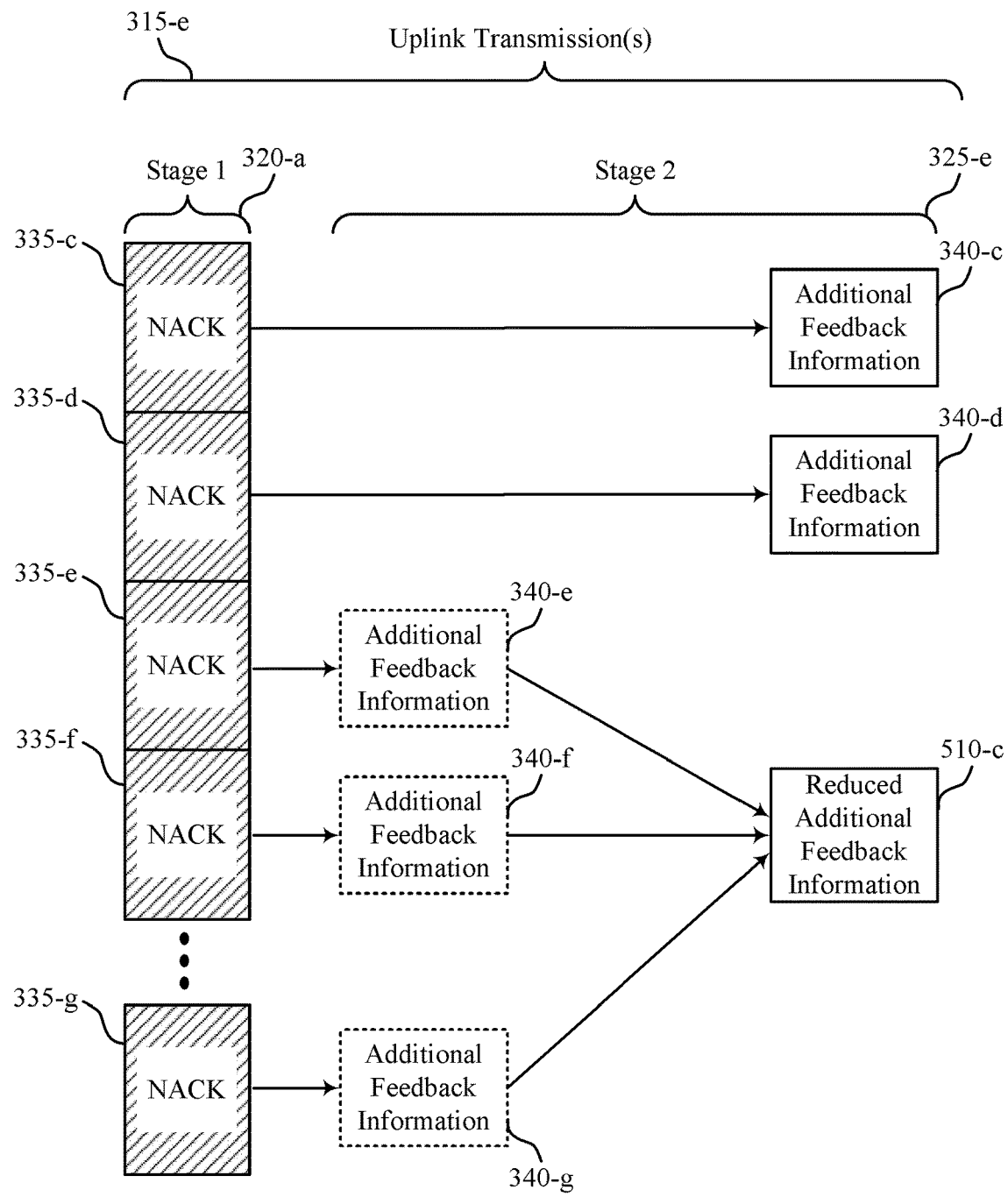

FIG. 6 illustrates an example of a communication diagram 600 that supports two-stage feedback procedures in accordance with aspects of the present disclosure. In some examples, the communication diagram 600 may implement aspects of wireless communications systems 100 or 200.

The communication diagram 600 may include a first stage 320-*a* of feedback information and a second stage 325-*e* of feedback information. The communication diagram 500 may also depict a procedure for reducing a size of the second stage 325 of feedback information by jointly encoding a portion of the second stage 325.

In some cases, the additional feedback information 340 may carry information in accordance with Table 1. That is, a value of the additional feedback information 340 may correspond to a scheme that jointly encodes DTX information and channel information.

The first stage 320-*a* of feedback information may include NACK 335-*c*, NACK 335-*d*, NACK 335-*e*, NACK 335-*f*, and NACK 335-*g*. Each NACK may be associated with a transport block (or code block group) received over a particular component carrier—e.g., NACK 335-*c* may be associated with a first component carrier, NACK 335-*d* may be associated with a second component carrier, and so on. The first stage of feedback information may also include one or more ACKs.

In some examples, a UE may generate additional feedback information 340-*c*, additional feedback information 340-*d*, additional feedback information 340-*e*, additional feedback information 340-*g*, and additional feedback information 340-*g* based on the NACKs 335. After generating the additional feedback information 340, the UE may determine that a combined size of the first stage 320-*a* and the second stage 325-*e* exceeds a first upper limit. Or the UE may determine a size of the second stage 325-*e* exceeds a second upper limit. After determining that an upper limit is exceeded, the UE may jointly encode a portion of the second stage 325-*e* to fit within resources allocated for transmitting the feedback information.

In some examples, the UE determines which portion of the second stage 325-*e* to jointly encode based on priority information associated with the different sets of additional feedback information 340. The priority information may include an indication of priority levels for component carriers used to transmit downlink information to the UE. In some examples, the priority information indicates that component carriers assigned higher indices have higher priorities than component carriers assigned lower indices, or vice versa. In some examples, the priority information indicates that component carriers that are used to carry certain data (e.g., high priority data or URLLC) have higher priorities than component carriers that are to carry other data (e.g., lower priority data). The priority information may also include an indication of priority levels for one or more slots used to transmit downlink information to the UE. In some cases, the priority information indicates that slots that occur later in time have higher priorities than slots that occur earlier in time, or vice versa. In some examples, additional feedback information 340 that is associated with a slot and a component carrier having a first index may have a higher priority than additional feedback information 340 that is associated with an earlier slot and another component carrier that has a higher priority than the first component carrier.

In some examples, the UE may receive priority information indicating descending priority levels for additional feedback information 340-*c* through additional feedback information 340-*g*—with additional feedback information 340-*c* having the highest priority level. After determining that an upper limit for reporting feedback information is exceeded, the UE may jointly encode sets of additional feedback information 340 based on the priority information. For example, if the additional feedback information 340 includes ten (10) bits and five (5) bits are available for the second stage 325-*e*, then the UE may jointly encode (or combine) additional feedback information 340-*e*, additional feedback information 340-*f*, and additional feedback information 340-*g* into reduced additional feedback information 510-*c*, where reduced additional feedback information 510-*c* may be represented using one (1) bit.

In some examples, reduced additional feedback information 510-*c* may be used to report different CQI adjustments based on CQI adjustments that were previously determined for additional feedback information 340-*e* through additional feedback information 340-*g*. For example, the UE may select a bit value of "1" for reduced additional feedback information 510-*c* after determining that at least one of additional feedback information 340-*e* through additional feedback information 340-*g* included a CQI adjustment of greater than or equal to 2. Otherwise, the UE may select a bit value of "0" for reduced additional feedback information 510-*c* after determining that each of additional feedback information 340-*e* through additional feedback information 340-*g* included a CQI adjustment of less than 2. Table 4, provided below, illustrates a joint encoding scheme for combining sets of additional feedback information 340.

TABLE 4

| Bit value | Information conveyed by bit value |
| --- | --- |
| 0 | CQI update/refinement. The UE may determine that the PDSCH failed to be decoded with a marginal logarithm of likelihood ratio (LLR). This bit value may indicate that a retransmission may pass with the same MCS (e.g., X = 0). |
| 1 | CQI update/refinement. The UE may determine that the PDSCH failed to be decoded with a medium-to-low LLR. This bit value may indicate that a retransmission may pass with a lower MCS (e.g., Y = 2). |

In some examples, reduced additional feedback information 510-c may be used to report different DTX and CQI information based on DTX and CQI information that were previously determined for additional feedback information 340-e through additional feedback information 340-g. For example, the UE may select a bit value of "0" for reduced additional feedback information 510-c after determining that at least one of additional feedback information 340-e through additional feedback information 340-g included a DTX indicator. Otherwise, the UE may select a bit value of "1" for reduced additional feedback information 510-c. Table 5, provided below, illustrates a joint encoding scheme for combining sets of additional feedback information 340.

TABLE 5

| Bit value | Information conveyed by bit value |
| --- | --- |
| 0 | DTX Indicator. The UE may fail to detect the DCI scheduling the PDSCH of the downlink transmission. In this case, the channel information associated with the PDSCH is not included because UE may not be able to identify the PDSCH after failing to detect the DCI. |
| 1 | CQI update/refinement. The UE may determine that the PDSCH failed to be decoded with a marginal logarithm of likelihood ratio (LLR). This bit value may indicate that a retransmission may pass with a lower MCS (e.g., L = 3). |

In some examples, a UE may determine that a size of the first stage 320-a of feedback information and the second stage 325-e of feedback information will exceed an upper limit—e.g., by multiplying the number of NACKs by a bit width for the second stage 325-e. In such cases, the UE may generate the second stage 325-e of feedback information in accordance with priority information obtained by the UE. In some examples, the UE may receive priority information indicating the priority levels of additional feedback information 340-c to additional feedback information 340-g, where additional feedback information 340-c may have the highest priority level. In some examples, after determining that an upper limit for reporting feedback information will be exceeded, the UE may refrain from generating additional feedback information 340-e through additional feedback information 340-g and may instead generate reduced additional feedback information 510-c.

Thus, the second stage 325-e of feedback may be obtained. The UE may transmit the first stage 320-a and the second stage 325-e of feedback information in uplink transmission 315-e to a base station. The transmission of the second stage 325-e may include additional feedback information 340-c, additional feedback information 340-d, and reduced additional feedback information 510-c.

In some cases, a base station that receives uplink transmission 315-e may determine that additional feedback information 340-e through additional feedback information 340-g were combined—e.g., based on a number of NACKs received in the first stage 320-a, an upper limit for reporting the feedback information, and priority information for the different component carriers and/or slots associated with the sets of additional feedback information 340. In some cases, the base station further determines that additional feedback information 340-e through additional feedback information 340-g were combined based on determining that the UE is configured in a mode associated with reducing a size of feedback information by jointly encoding sets of additional feedback information in accordance with priority information.

In some cases, a base station that receives uplink transmission 315-e may determine that the bit corresponding to reduced additional feedback information 510-c conveys information for a first component carrier associated with NACK 335-e, a second component carrier associated with NACK 335-f, and a third component carrier associated with NACK 335-g. In some examples, the base station may apply a same adaptation to transmission parameters used for initial transmissions over the associated component carriers—e.g., for each of the component carriers, the base station may decrease a CQI used for the initial transmissions by a same amount.

The operations described above may be more generally applied to a decreased or increased number of sets of additional feedback information 340. For example, if an increased number of sets of additional feedback information 340 are included in second stage 325-e, the UE may similarly combine the additional sets of additional feedback information 340 into reduced additional feedback information 510-c—e.g., if the additional sets of additional feedback information 340 have a lower priority than additional feedback information 340-c and additional feedback information 340-d. In some examples, if an increased number of sets of additional feedback information 340 are included, the UE may combine the additional feedback information 340-d into reduced additional feedback information 510-c—e.g., if an additional set of additional feedback information 340 has a higher priority than additional feedback information 340-d.

Figure 7:
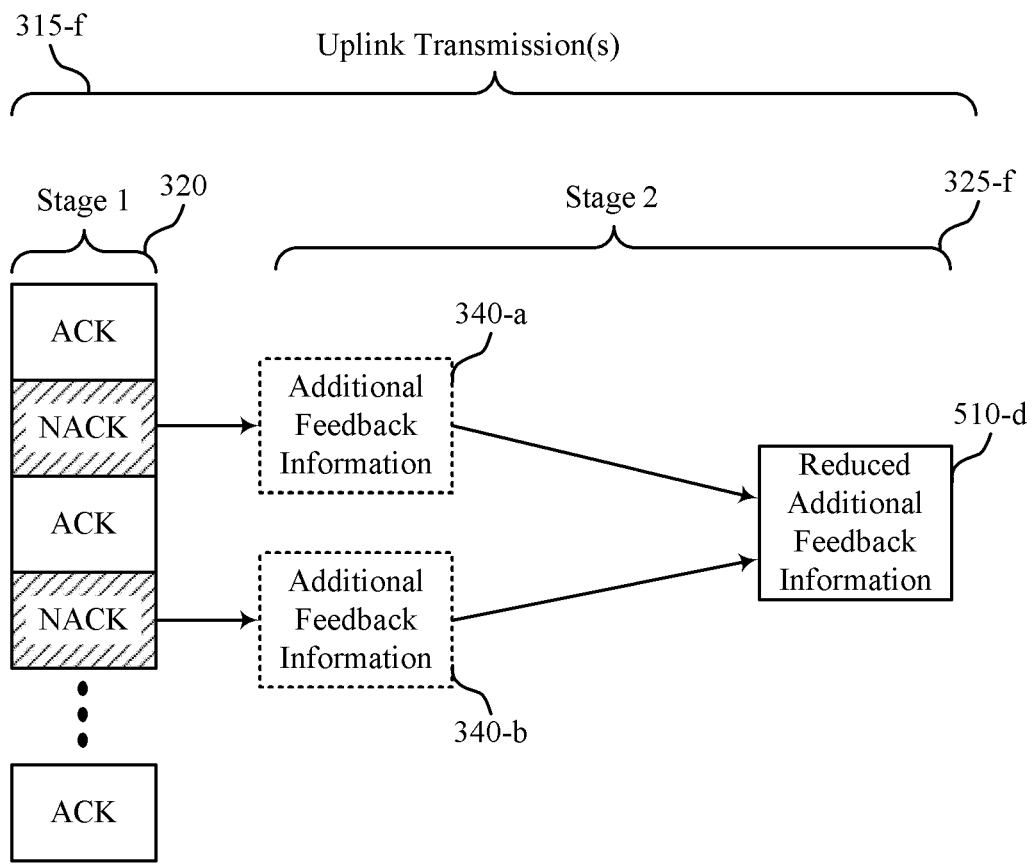

FIG. 7 illustrates an example of a communication diagram 700 that supports two-stage feedback procedures in accordance with aspects of the present disclosure. In some examples, the communication diagram 700 may implement aspects of wireless communications systems 100 or 200.

The communication diagram 700 may include the first stage 320 of feedback information and the second stage 325 of feedback information described in FIG. 3. The communication diagram 700 may also depict a procedure for reducing a size of the second stage 325 of feedback information by jointly encoding the second stage 325 of feedback information.

In some cases, additional feedback information 340-a and additional feedback information 340-b may carry information in accordance with Table 1. That is, a value of additional feedback information 340-a or additional feedback information 340-b may correspond to a scheme that jointly encodes DTX information and channel information.

In some examples, a UE may determine that a combined size of the first stage 320 of feedback information and the second stage 325-f of feedback information exceeds a total upper limit. In other examples, the UE may determine that size of the second stage 325-f of feedback information exceeds a second upper limit. After determining that the upper limit is exceeded, the UE may jointly encode the second stage 325-f of feedback information to fit within resources allocated for transmitting the feedback information.

In some examples, the UE may jointly encode the second stage 325-f of feedback information based on a table that provides a mapping to a bit value based on a number of NACKs, channel information, and a size of available resources for transmitting the second stage 325-f. In some cases, the size of the available resources may be based on an upper limit. Table 6, provided below, illustrates a joint encoding scheme for combining the sets of additional feedback information 340 included in the second stage 325-f when the first stage 320 of information includes two NACKs and two bits are available for transmitting the second stage 325-b of feedback information.

TABLE 6

| Bit value | Information conveyed by bit value |
|---|---|
| 00 | Double DTX Indicator. Indicates that the UE failed to detect the DCI scheduling the data corresponding to both sets of additional feedback information. |
| 01 | Single DTX Indicator & CQI update/refinement. Indicates that the UE failed to detect the DCI scheduling the data corresponding to the first set of additional feedback information. Also, indicates that a retransmission of the data corresponding to the second set of additional feedback information may pass with a lower MCS (e.g., X = 2). |
| 10 | Single DTX Indicator & CQI update/refinement. Indicates that the UE failed to detect the DCI scheduling the data corresponding to the second set of additional feedback information. Also, indicates that a retransmission of the data corresponding to the first set of additional feedback information may pass with a lower MCS (e.g., X = 2). |
| 11 | CQI update/refinement. Indicates that a retransmission of data corresponding to the first and second set of additional feedback information may pass with a lower MCS (e.g., X = 2). |

In some examples, a different table is used if a different number of NACKs is received or a different size of resources are available for transmitting the second stage 325-f. In some examples, the UE may identify a table for joint encoding the second stage 325-f based on a number of NACKs included in the first stage 320 and a size of available resources for transmitting the second stage 325-f. In some cases, a base station may indicate multiple tables to the UE that are each associated with a particular number of NACKs and upper limits.

In some examples, a UE may determine that a size of the first stage 320 of feedback information and the second stage 325-f of feedback information will exceed an upper limit—e.g., by multiplying the number of NACKs by a bit width for the second stage 325-f. In such cases, the UE may generate the second stage 325-f of feedback information in accordance with a table for jointly encoding the second stage 325-f. In some examples, after determining that an upper limit for reporting feedback information will be exceeded, the UE may refrain from generating additional feedback information 340-a and additional feedback information 340-b and may instead directly generate reduced additional feedback information 510-d.

Thus, the second stage 325-f of feedback may be obtained. The UE may transmit the first stage 320-a and the second stage 325-f of feedback information in uplink transmission 315-f to a base station. The transmission of the second stage 325-e may include reduced additional feedback information 510-d.

In some cases, a base station that receives uplink transmission 315-f may determine that additional feedback information 340-a and additional feedback information 340-b were combined—e.g., based on a number of NACKs received in the first stage 320-a, an upper limit for reporting the feedback information, and priority information for the different component carriers and/or slots associated with the sets of additional feedback information 340. In some cases, the base station further determines that additional feedback information 340-a and additional feedback information 340-b were combined based on determining that the UE is configured in a mode associated with reducing a size of feedback information by jointly encoding the sets of additional feedback information included in the second stage 325-f.

The operations described above may be more generally applied to an increased number of sets of additional feedback information 340. For example, if an increased number of sets of additional feedback information 340 are included in second stage 325-f, the UE may similarly combine the additional sets of additional feedback information 340 into reduced additional feedback information 510-d—e.g., using a corresponding table.

Figure 8:
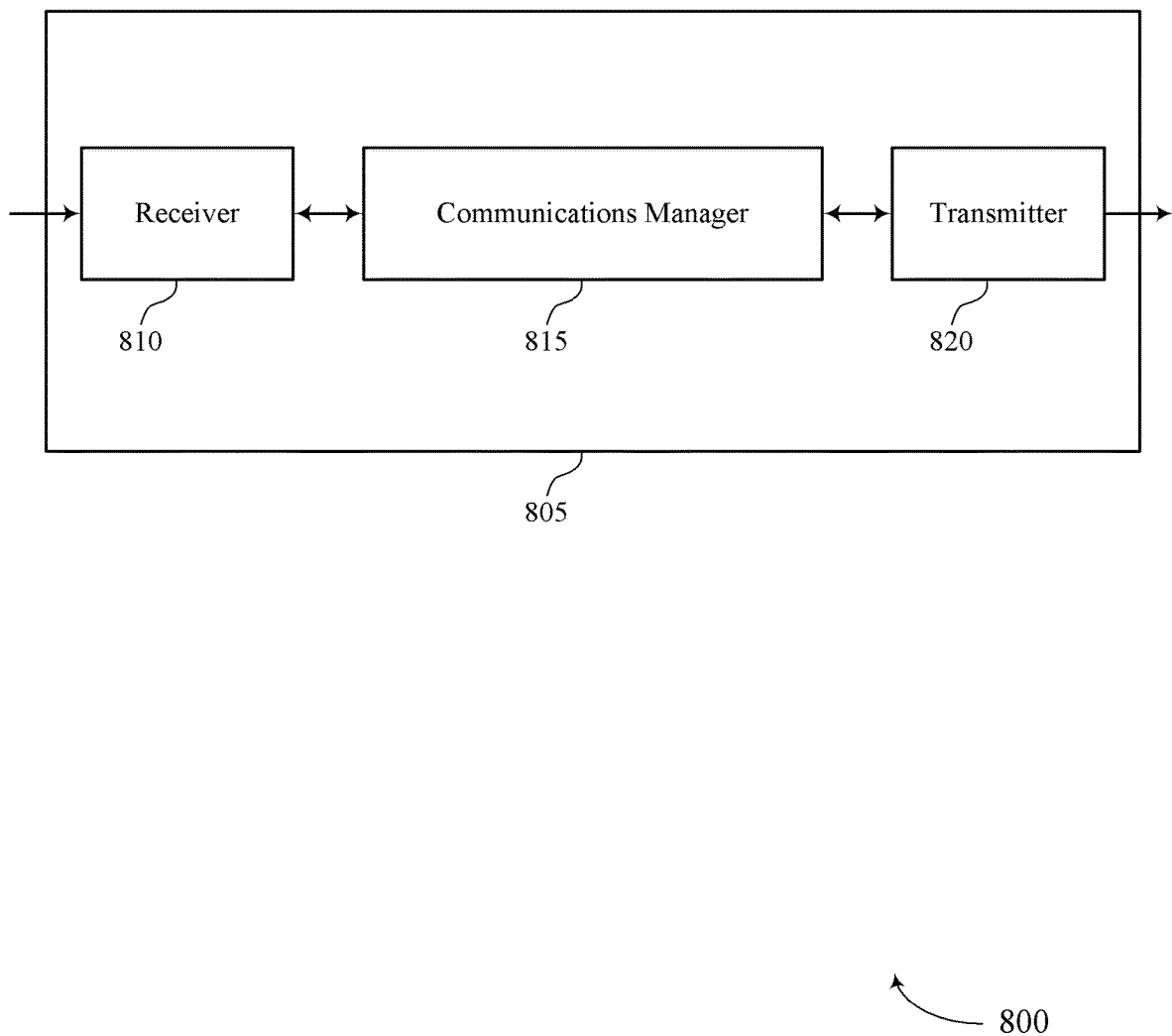
FIGS. 8 and 9 show block diagrams of devices that support two-stage feedback procedures in accordance with aspects of the present disclosure.

FIG. 8 shows a block diagram 800 of a device 805 that supports two-stage feedback procedures in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to two-stage feedback procedures, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may generate, for a first stage of feedback associated with a first set of uplink resources, first information that includes acknowledgment feedback associated with decoding downlink data information over each component carrier of a set of component carriers, generate, for a second stage of feedback associated with a second set of uplink resources, second information that is associated with a failure to decode downlink data information over one or more component carriers of the set of component carriers, generate third information that is associated with the failure to decode the downlink data information based on an upper limit for the feedback being exceeded by the first information and the second information, where the third information includes a reduction of the second information, and transmit the first stage of feedback including the first information using the first set of uplink resources and the second stage of feedback including the third information using the second set of uplink resources. The communications manager 815 may be an example of aspects of the communications manager 1110 described herein.

The communications manager 815 as described herein may be implemented to realize one or more potential advantages. One implementation may allow for reliability of service to be improved at a UE 115. That is, by reporting acknowledgment feedback with channel information, a reliability of retransmissions may be increased. Another implementation may allow for latency to be improved at the UE 115. That is, by reporting acknowledgment feedback with channel information, a number of retransmissions of data to the UE may be reduced—e.g., based on increasing the reliability of the retransmission. Another implementation may allow for resource utilization to be improved at the UE 115. That is, by limiting a size of the acknowledgment feedback, less resources may be used to communicate acknowledgement feedback with channel information.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
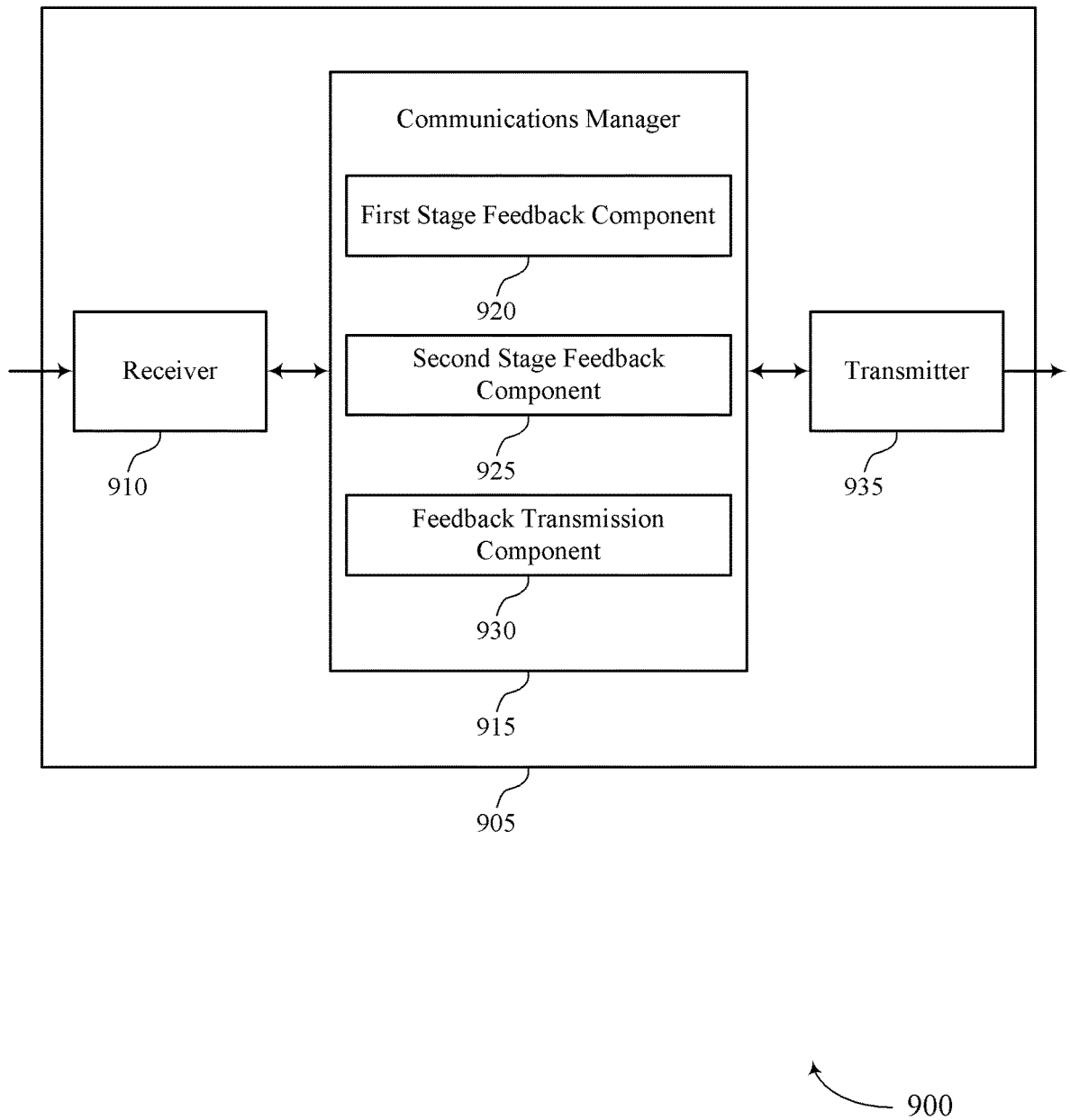

FIG. 9 shows a block diagram 900 of a device 905 that supports two-stage feedback procedures in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to two-stage feedback procedures, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a first stage feedback component 920, a second stage feedback component 925, and a feedback transmission component 930. The communications manager 915 may be an example of aspects of the communications manager 1110 described herein.

The first stage feedback component 920 may generate, for a first stage of feedback associated with a first set of uplink resources, first information that includes acknowledgment feedback associated with decoding downlink data information over each component carrier of a set of component carriers.

The second stage feedback component 925 may generate, for a second stage of feedback associated with a second set of uplink resources, second information that is associated with a failure to decode downlink data information over one or more component carriers of the set of component carriers and generate third information that is associated with the failure to decode the downlink data information based on an upper limit for the feedback being exceeded by the first information and the second information, where the third information includes a reduction of the second information.

The feedback transmission component 930 may transmit the first stage of feedback including the first information using the first set of uplink resources and the second stage of feedback including the third information using the second set of uplink resources.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
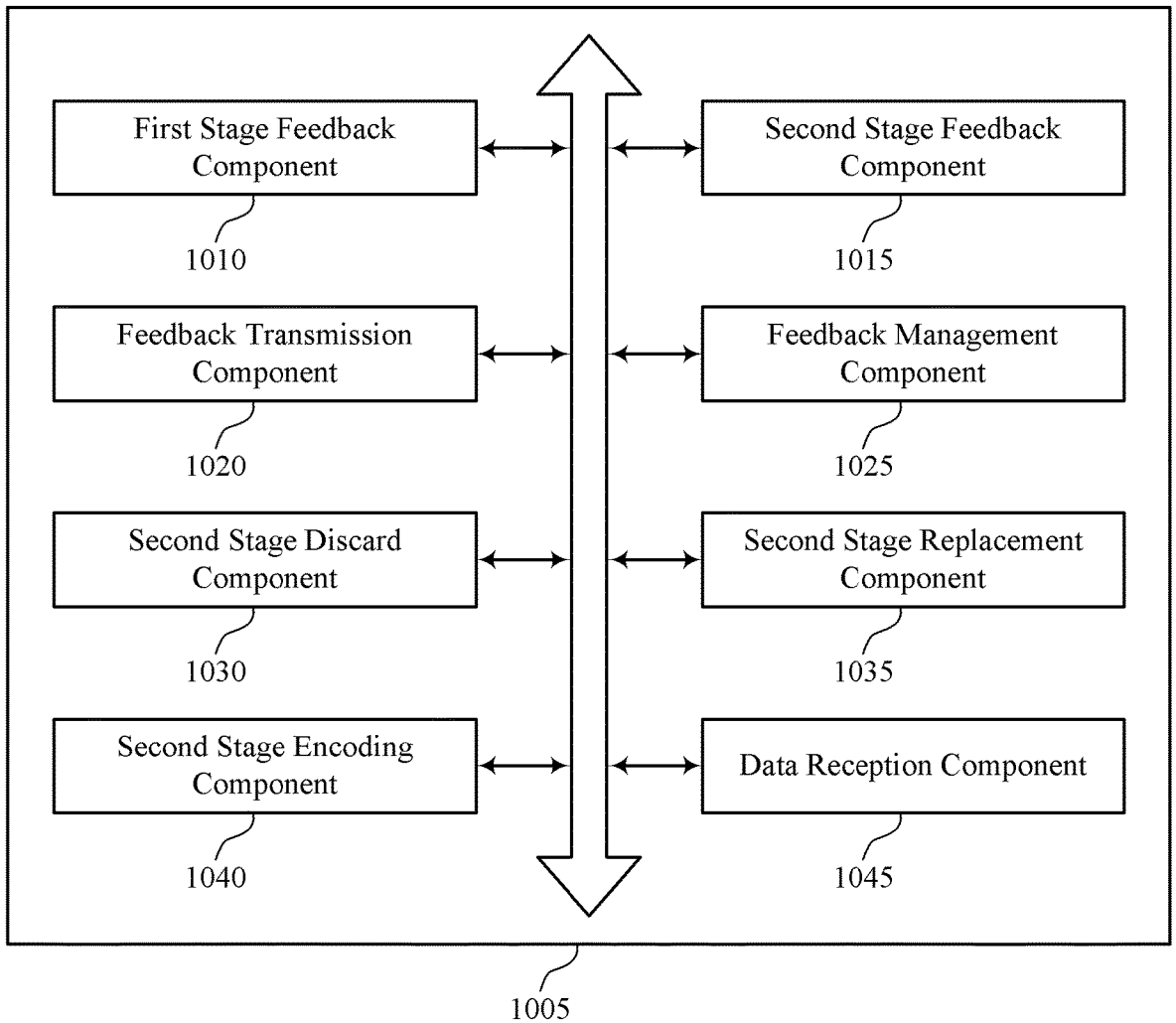
FIG. 10 shows a block diagram of a communications manager that supports two-stage feedback procedures in accordance with aspects of the present disclosure.

FIG. 10 shows a block diagram 1000 of a communications manager 1005 that supports two-stage feedback procedures in accordance with aspects of the present disclosure. The communications manager 1005 may be an example of aspects of a communications manager 815, a communications manager 915, or a communications manager 1110 described herein. The communications manager 1005 may include a first stage feedback component 1010, a second stage feedback component 1015, a feedback transmission component 1020, a feedback management component 1025, a second stage discard component 1030, a second stage replacement component 1035, a second stage encoding component 1040, and a data reception component 1045. Each of these modules may communicate, directly or indirectly, with one another (e.g., via one or more buses).

The first stage feedback component 1010 may generate, for a first stage of feedback associated with a first set of uplink resources, first information that includes acknowledgment feedback associated with decoding downlink data information over each component carrier of a set of component carriers.

The second stage feedback component 1015 may generate, for a second stage of feedback associated with a second set of uplink resources, second information that is associated with a failure to decode downlink data information over one or more component carriers of the set of component carriers.

In some examples, generating third information that is associated with the failure to decode the downlink data information based on an upper limit for the feedback being exceeded by the first information and the second information, where the third information includes a reduction of the second information.

In some examples, the second stage feedback component 1015 may perform a procedure for reducing a size of the second information based on the upper limit for the feedback being exceeded by the first information and the second information, where the third information is generated based on performing the procedure.

In some examples, discarding a first portion of the second information, where the reduction of the second information includes a second portion of the second information that is different than the first portion of the second information.

In some examples, the second stage feedback component 1015 may identify a first subset of the second information that is associated with a failure to decode first downlink data information over a first component carrier of the set of component carriers, the first subset of the second information having a first length.

In some examples, the second stage feedback component 1015 may identify a second subset of the second information that is associated with a failure to decode second downlink data information over a second component carrier of the set of component carriers, the second subset of the second information having the first length.

In some examples, the second stage feedback component 1015 may identify a second subset of the second information that is associated with a failure to decode second downlink data information over a second component carrier of the set of component carriers, the second subset having the first length.

In some examples, encoding a first portion of the second information, where the reduction of the second information includes the encoded first portion and a second portion of the second information that is different than the first portion of the second information.

In some examples, the second stage feedback component 1015 may identify at least one subset of the second information that is associated with a failure to decode at least one set of downlink data information over at least one component carrier of the set of component carriers, the at least one subset of the second information having a first length.

In some examples, the second stage feedback component 1015 may identify a set of subsets of the second information that is associated with a failure to decode multiple sets of downlink data information over multiple component carriers of the set of component carriers, the set of subsets of the second information having a first combined length.

In some examples, encoding the second information, where the reduction of the second information includes the encoded second information.

In some examples, the second stage feedback component 1015 may determine that the combined size of the first information and the second information exceeds the first upper limit for the first stage of feedback and the second stage of feedback or that the size of the second information exceeds the second upper limit for the second stage of feedback.

In some cases, the third information is generated based on a combined size of the first information and the second information exceeding a first upper limit for the first stage of feedback and the second stage of feedback or a size of the second stage of feedback exceeding a second upper limit for the second stage of feedback.

In some cases, the second information is associated with the failure to decode downlink data information over the one or more component carriers in one or more of a set of slots.

In some cases, the third information is generated based on a priority of a first slot of the set of slots relative to a second slot of the set of slots.

In some cases, the third information is generated based on a combined size of the first information and the second information exceeding a first upper limit for the first stage of feedback and the second stage of feedback or a size of the second stage of feedback exceeding a second upper limit for the second stage of feedback.

In some cases, a second combined size of the first information and the third information is less than or equal to the first upper limit or a second size of the third information is less than or equal to the second upper limit.

The feedback transmission component 1020 may transmit the first stage of feedback including the first information using the first set of uplink resources and the second stage of feedback including the third information using the second set of uplink resources.

In some cases, the first set of uplink resources are part of a first physical uplink control channel resource and the second set of uplink resources are part of a second physical uplink control channel resource different than the first physical uplink control channel resource, or.

In some cases, the first set of uplink resources and the second set of uplink resources are part of a same physical uplink control channel resource.

The feedback management component 1025 may receive a signal including a first indication of a first value of the first upper limit or a second indication of a second value of the second upper limit.

In some examples, the feedback management component 1025 may receive a signal including an indication of priority levels for the set of component carriers.

In some examples, the feedback management component 1025 may receive a second signal including an indication of a second priority level for a first component carrier of the set of component carriers based on a configuration of the first component carrier.

In some examples, the feedback management component 1025 may receive a signal including an indication of a priority level for each slot of the set of slots.

The second stage discard component 1030 may select the first subset of the second information based on a first priority of the first component carrier relative to a second priority of the second component carrier, where the discarded first portion of the second information includes the selected first subset of the second information.

In some examples, selecting the second subset of the second information based on a combined size of the first information and the third information exceeding a first upper limit or a second size of the third information exceeding a second upper limit after the fourth information is added, where the discarded first portion of the second information includes the selected second subset of the second information.

In some examples, the second stage discard component 1030 may select the fourth information based on a third combined size of the first information and the third information exceeding the first upper limit or a third size of the third information exceeding the second upper limit after the fifth information is added.

In some examples, the second stage discard component 1030 may discard the fourth information based on the selecting.

In some examples, selecting a piece of the first subset of the second information based on a first priority of the first component carrier relative to a second priority of the second component carrier, where the discarded first portion of the second information includes the selected piece of the first subset of the second information.

In some cases, the first subset of the second information discarded from the second information includes one of a first bit value for indicating a failure to receive a downlink control message associated with a downlink data message transmitted over the first component carrier, a second bit value for indicating a first quality of the first component carrier, a third bit value for indicating a second quality of the first component carrier, or a fourth bit value for indicating a third quality of the first component carrier.

In some cases, the second subset of the second information discarded from the second information includes one of the first bit value for indicating a failure to receive a second downlink control message associated with a second downlink data message transmitted over the second component carrier, the second bit value for indicating the first quality of the second component carrier, the third bit value for indicating the second quality of the second component carrier, or the fourth bit value for indicating the third quality of the second component carrier.

The second stage replacement component 1035 may add, to the second portion of the second information, fourth information in place of the discarded first subset of the second information, the fourth information having a second length that is smaller than the first length.

In some examples, the second stage replacement component 1035 may add, to the second portion of the second information, fifth information in place of the discarded second subset of the second information, the fifth information having the second length.

In some cases, the fourth information added to the second portion of the second information includes one of a fifth bit value for indicating the failure to receive the downlink control message or a sixth bit value for indicating a fourth quality of the first component carrier based on the discarded first subset of the second information, where the fifth bit value and the sixth bit value include a fewer quantity of bits than the first bit value, the second bit value, the third bit value, or the fourth bit value.

In some cases, the fifth information added to the second portion of the second information includes one of the fifth bit value for indicating the failure to receive the second downlink control message or the sixth bit value for indicating the fourth quality of the second component carrier based on the discarded first subset of the second information.

The second stage encoding component 1040 may select the set of subsets of the second information based on a first priority of the at least one component carrier relative to a second priority of the multiple component carriers, where the encoded first portion includes fourth information resulting from a combination of the selected set of subsets of the second information, the fourth information having a second length that is smaller than a combined length of the set of subsets of the second information.

In some examples, the second stage encoding component 1040 may identify a set of subsets of the second information that is associated with a failure to decode multiple sets of downlink data information over multiple component carriers of the set of component carriers, the set of subsets of the second information having a first combined length that is equivalent to a first length of the second information and greater than a second length of the encoded second information.

In some examples, the second stage encoding component 1040 may determine a bit value of a set of bit values that corresponds to a combination of the set of subsets of the second information based on a table that provides a mapping between the set of bit values and a set of combinations of the set of subsets of the second information.

In some examples, the second stage encoding component 1040 may select the table from a set of tables based on a value of the upper limit and a quantity of the one or more component carriers over which the failure to decode downlink data information occurred.

In some cases, the fourth information includes one of a first bit value for indicating a first combined quality of the multiple component carriers or a second bit value for indicating a second combined quality of the multiple component carriers.

In some cases, the fourth information includes one of a first bit value for indicating a failure to receive a downlink control message over at least one of the multiple component carriers or a second bit value for indicating a combined quality of the multiple component carriers.

The data reception component 1045 may receive one or more signals over the set of component carriers.

In some examples, the data reception component 1045 may determine that downlink data information associated with the one or more component carriers failed to be successfully decoded.

Figure 11:
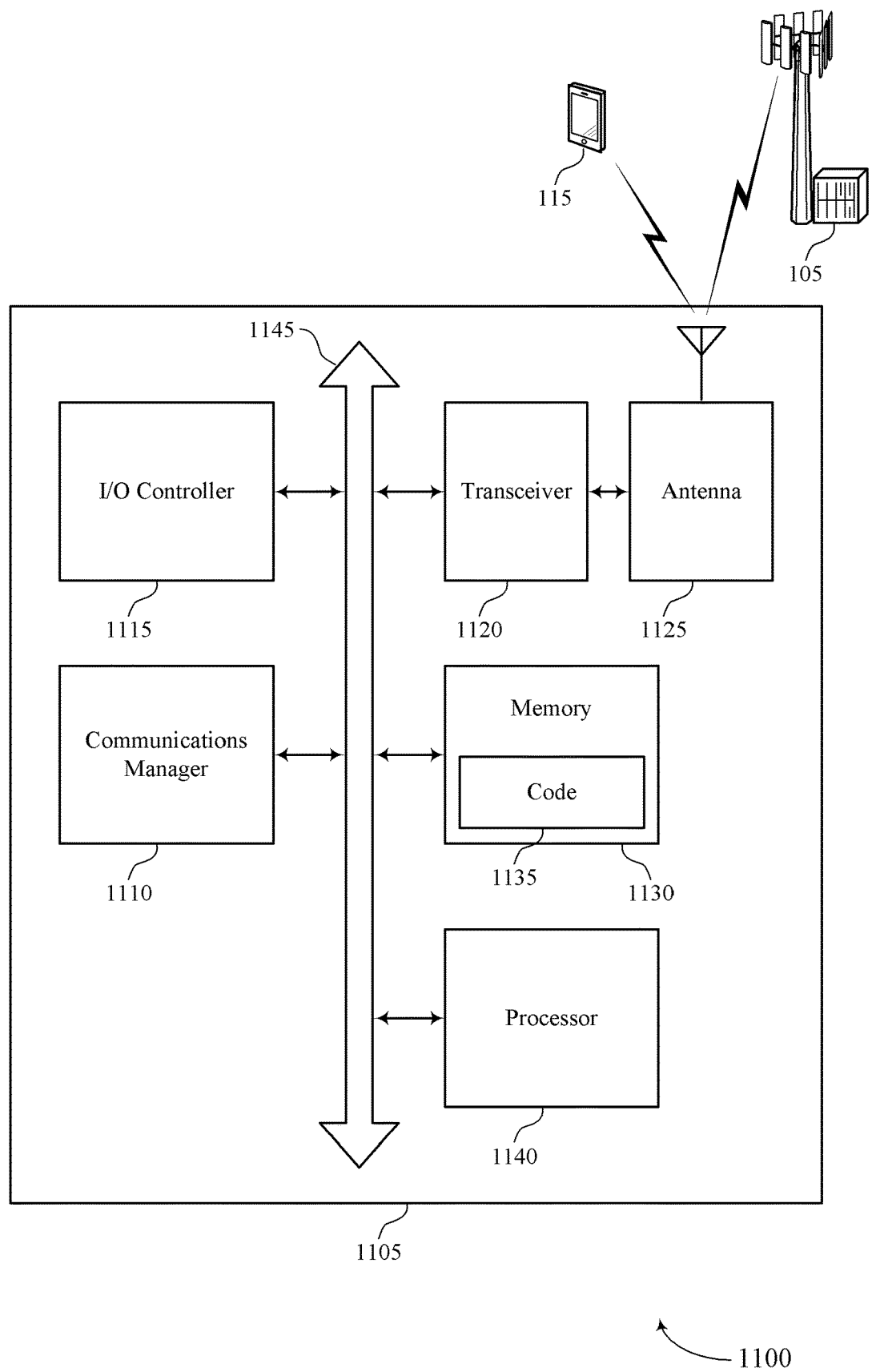
FIG. 11 shows a diagram of a system including a device that supports two-stage feedback procedures in accordance with aspects of the present disclosure.

FIG. 11 shows a diagram of a system 1100 including a device 1105 that supports two-stage feedback procedures in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may generate, for a first stage of feedback associated with a first set of uplink resources, first information that includes acknowledgment feedback associated with decoding downlink data information over each component carrier of a set of component carriers, generate, for a second stage of feedback associated with a second set of uplink resources, second information that is associated with a failure to decode downlink data information over one or more component carriers of the set of component carriers, generate third information that is associated with the failure to decode the downlink data information based on an upper limit for the feedback being exceeded by the first information and the second information, where the third information includes a reduction of the second information, and transmit the first stage of feedback including the first information using the first set of uplink resources and the second stage of feedback including the third information using the second set of uplink resources.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting two-stage feedback procedures).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
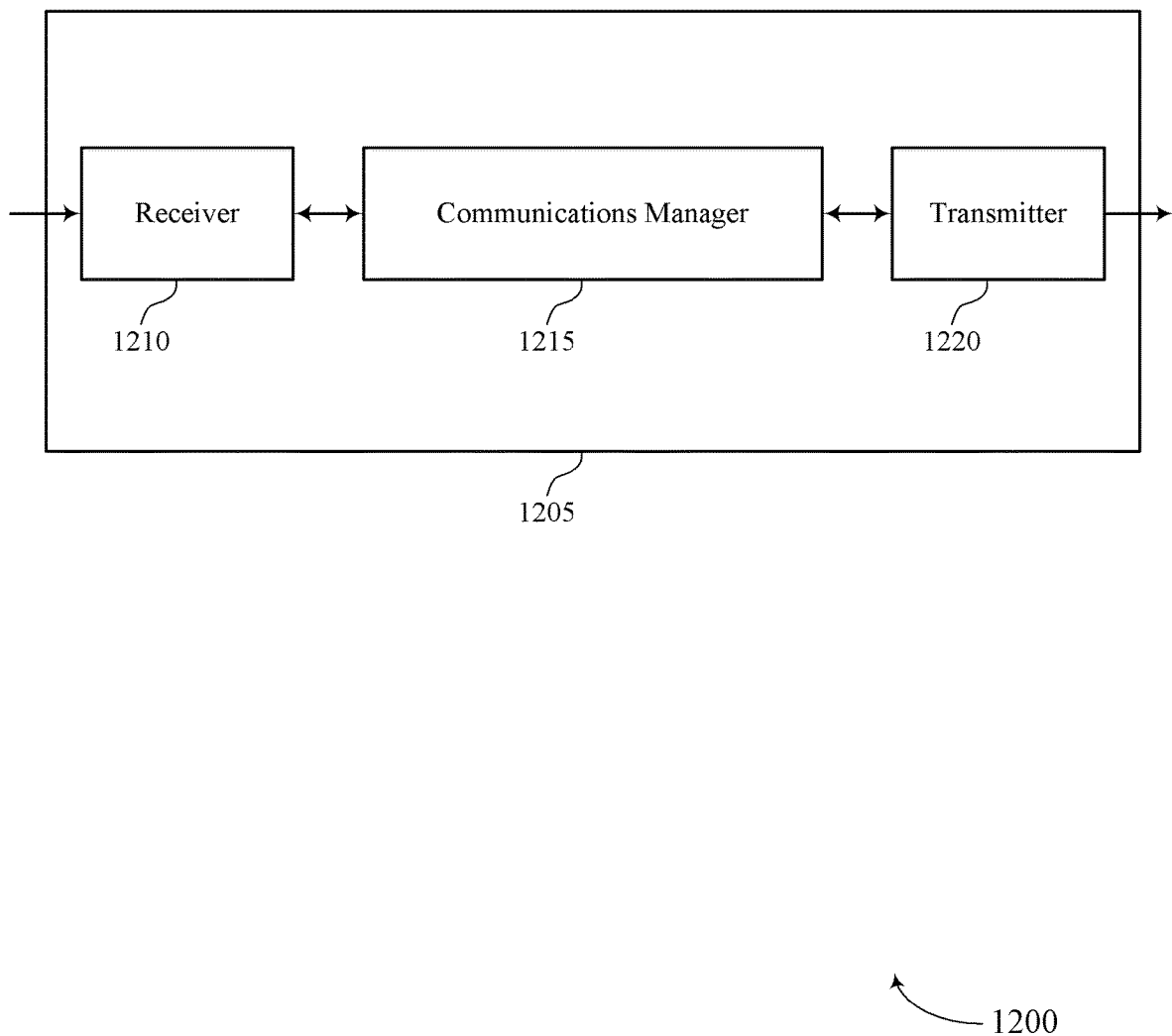
FIGS. 12 and 13 show block diagrams of devices that support two-stage feedback procedures in accordance with aspects of the present disclosure.

FIG. 12 shows a block diagram 1200 of a device 1205 that supports two-stage feedback procedures in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to two-stage feedback procedures, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a signal including a first upper limit for a first stage of feedback and a second stage of feedback or a second upper limit for the second stage of feedback, receive, from the UE, using a first set of uplink resources and in the first stage of feedback, first information that includes acknowledgment feedback associated with a decoding of downlink data information by the UE over each component carrier of a set of component carriers, receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decode the third information based on the procedure for reducing the size of the second information. The communications manager 1215 may be an example of aspects of the communications manager 1510 described herein.

The communications manager 1215 as described herein may be implemented to realize one or more potential advantages. One implementation may allow for reliability of service to be improved for a base station 105. That is, by reporting acknowledgment feedback with channel information, a reliability of retransmissions may be increased. Another implementation may allow for latency to be improved for the base station 105. That is, by reporting acknowledgment feedback with channel information, a number of retransmissions of data to a UE may be reduced—e.g., based on increasing the reliability of the retransmission. Another implementation may allow for resource utilization to be improved at the base station 105. That is, by limiting a size of the acknowledgment feedback, less resources may be used to communicate acknowledgement feedback with channel information.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
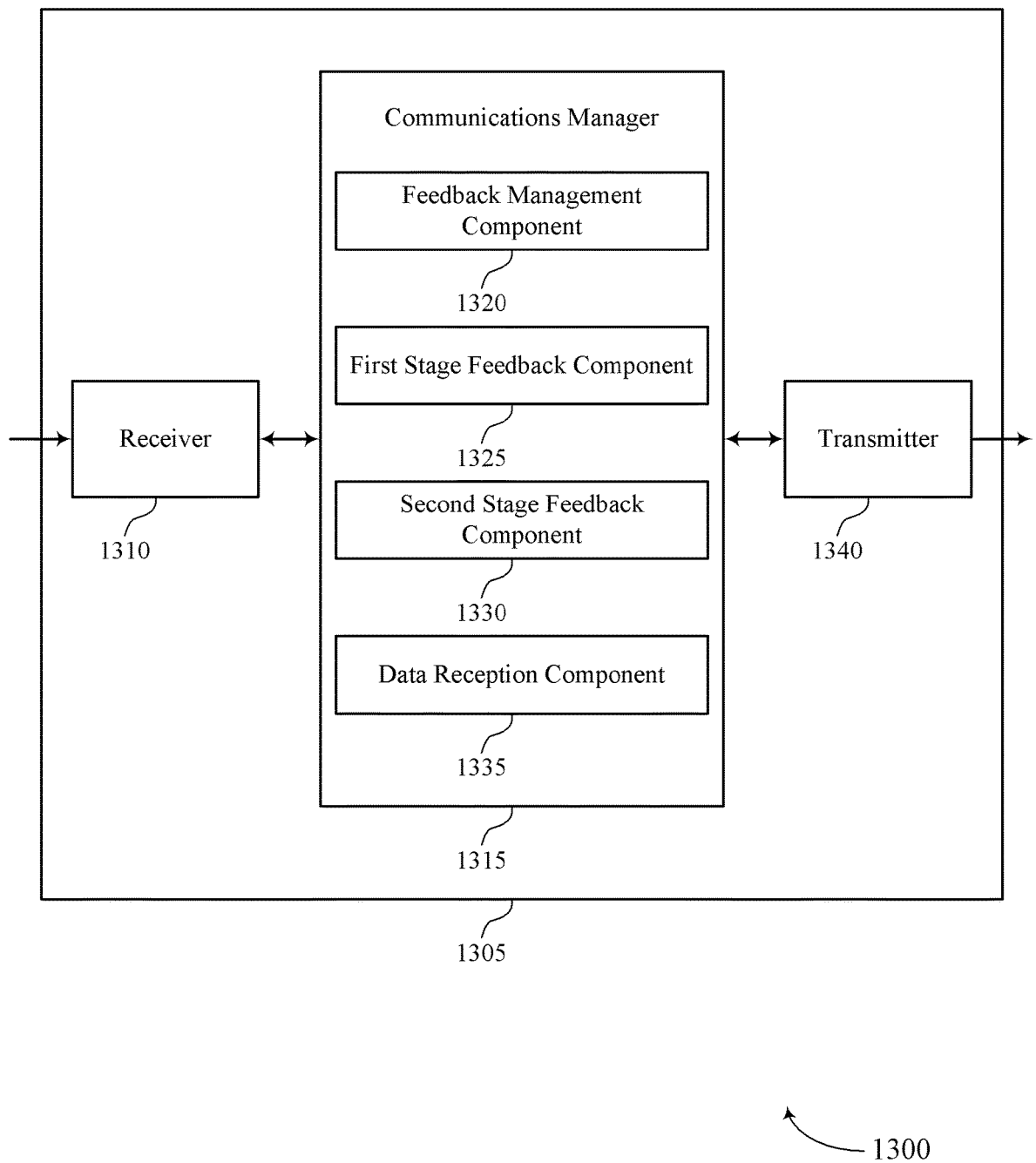

FIG. 13 shows a block diagram 1300 of a device 1305 that supports two-stage feedback procedures in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to two-stage feedback procedures, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a feedback management component 1320, a first stage feedback component 1325, a second stage feedback component 1330, and a data reception component 1335. The communications manager 1315 may be an example of aspects of the communications manager 1510 described herein.

The feedback management component 1320 may transmit, to a UE, a signal including a first upper limit for a first stage of feedback and a second stage of feedback or a second upper limit for the second stage of feedback.

The first stage feedback component 1325 may receive, from the UE, using a first set of uplink resources and in the first stage of feedback, first information that includes acknowledgment feedback associated with a decoding of downlink data information by the UE over each component carrier of a set of component carriers.

The second stage feedback component 1330 may receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information.

The data reception component 1335 may decode the third information based on the procedure for reducing the size of the second information.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
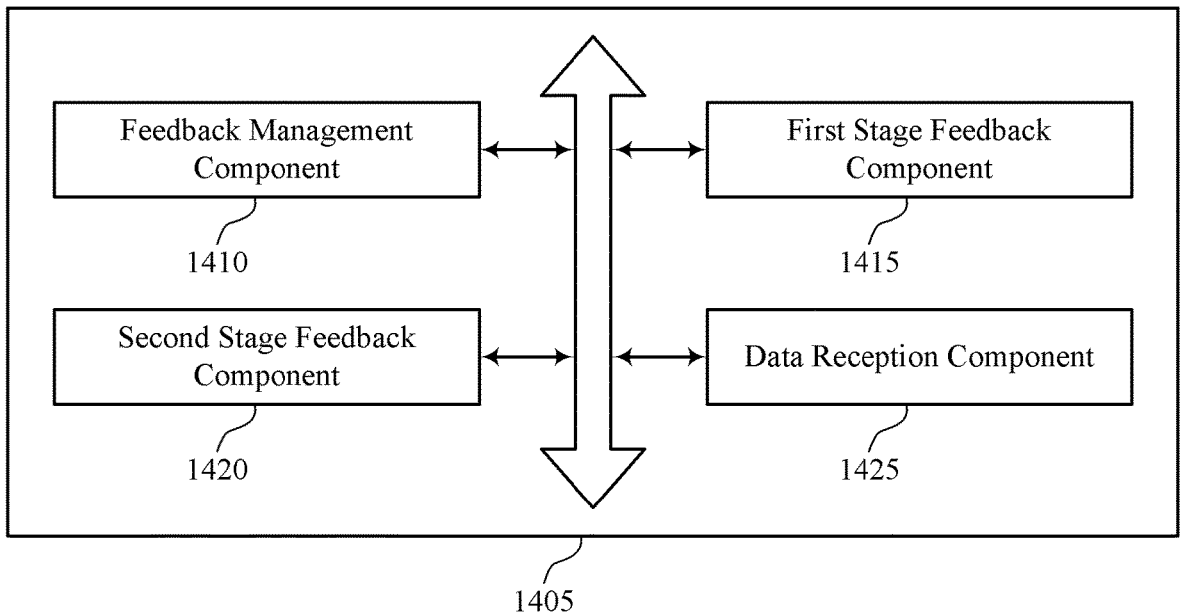
FIG. 14 shows a block diagram of a communications manager that supports two-stage feedback procedures in accordance with aspects of the present disclosure.

FIG. 14 shows a block diagram 1400 of a communications manager 1405 that supports two-stage feedback procedures in accordance with aspects of the present disclosure. The communications manager 1405 may be an example of aspects of a communications manager 1215, a communications manager 1315, or a communications manager 1510 described herein. The communications manager 1405 may include a feedback management component 1410, a first stage feedback component 1415, a second stage feedback component 1420, and a data reception component 1425. Each of these modules may communicate, directly or indirectly, with one another (e.g., via one or more buses).

The feedback management component 1410 may transmit, to a UE, a signal including a first upper limit for a first stage of feedback and a second stage of feedback or a second upper limit for the second stage of feedback.

In some examples, transmitting, to the UE, a second signal including an indication of the procedure for reducing the size of the second information, where the procedure for reducing the size of the second information includes a first set of operations for discarding a first portion of the second information, a second set of operations for encoding a second portion of the second information, or a third set of operations for encoding an entirety of the second information.

In some examples, the feedback management component 1410 may determine priority levels for the set of component carriers.

In some examples, the feedback management component 1410 may transmit, to the UE, a second signal including an indication of the priority levels for the set of component carriers.

In some examples, the feedback management component 1410 may determine an updated priority level for a first component carrier of the set of component carriers.

In some examples, the feedback management component 1410 may transmit, to the UE, a third signal including a second indication of the updated priority level for the first component carrier.

In some examples, the feedback management component 1410 may determine priority levels for a set of slots associated with the set of component carriers.

In some examples, the feedback management component 1410 may transmit, to the UE, a second signal including an indication of the priority levels for the set of slots.

In some examples, the feedback management component 1410 may transmit, to the UE, a second signal including an indication of a set of tables, each table including a correspondence between a set of bit values and a set of combinations of a set of subsets of the second information and corresponding to a combination of a first value of the first upper limit or a second value of the second upper limit and a quantity of the one or more component carriers over which the failure to decode downlink data information occurred.

In some cases, the signal includes a first indication of a first value of the first upper limit or a second indication of a second value of the second upper limit.

The first stage feedback component 1415 may receive, from the UE, using a first set of uplink resources and in the first stage of feedback, first information that includes acknowledgment feedback associated with a decoding of downlink data information by the UE over each component carrier of a set of component carriers.

The second stage feedback component 1420 may receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information.

The data reception component 1425 may decode the third information based on the procedure for reducing the size of the second information.

In some examples, the data reception component 1425 may decode the third information based on a first portion of the second information that is discarded by the UE based on priority levels of the one or more component carriers, a second portion of the second information that is encoded by the UE based on priority levels of the one or more component carriers, or an entirety of the second information that is encoded by the UE.

Figure 15:
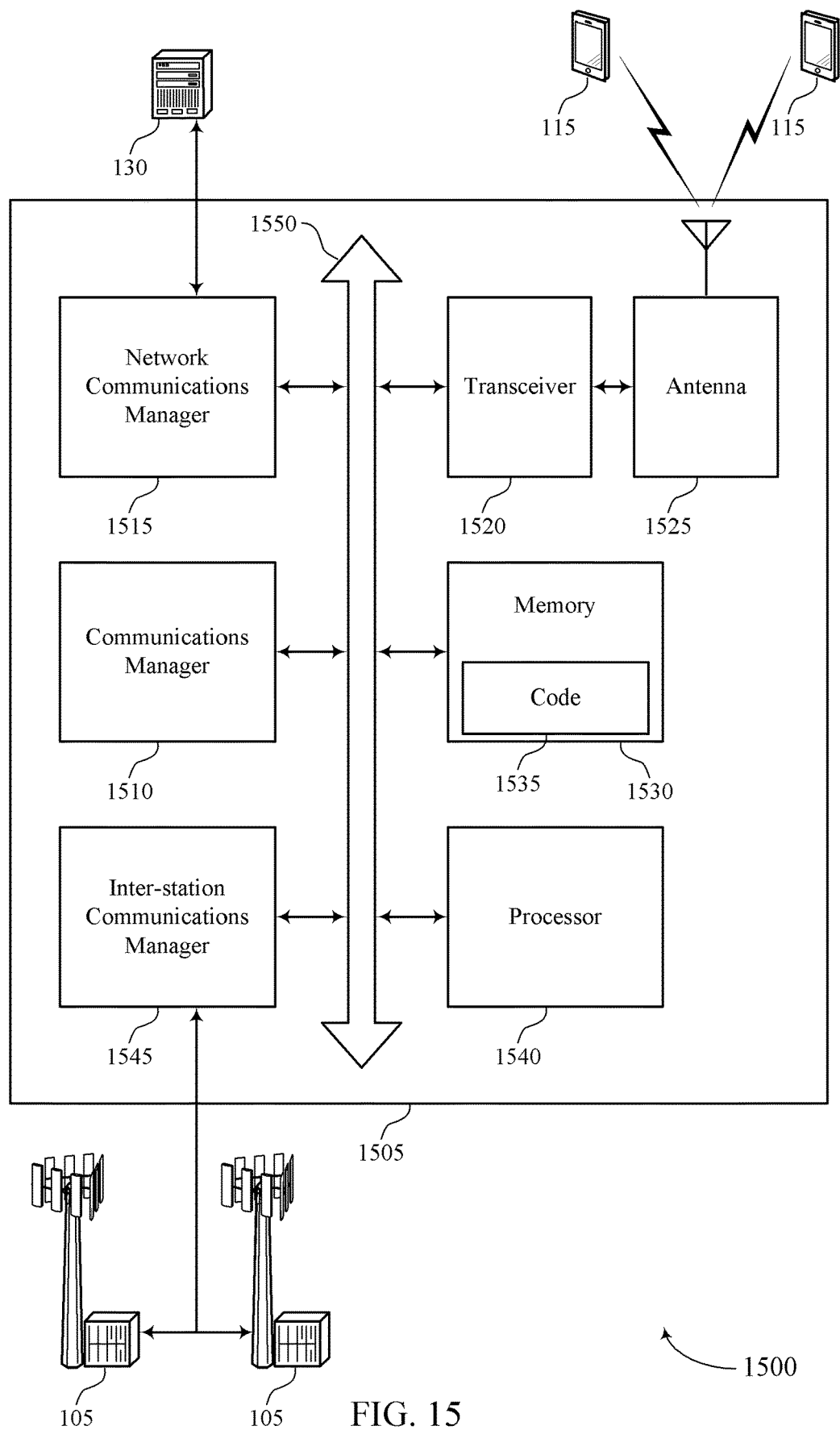
FIG. 15 shows a diagram of a system including a device that supports two-stage feedback procedures in accordance with aspects of the present disclosure.

FIG. 15 shows a diagram of a system 1500 including a device 1505 that supports two-stage feedback procedures in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a signal including a first upper limit for a first stage of feedback and a second stage of feedback or a second upper limit for the second stage of feedback, receive, from the UE, using a first set of uplink resources and in the first stage of feedback, first information that includes acknowledgment feedback associated with a decoding of downlink data information by the UE over each component carrier of a set of component carriers, receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information, and decode the third information based on the procedure for reducing the size of the second information.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting two-stage feedback procedures).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
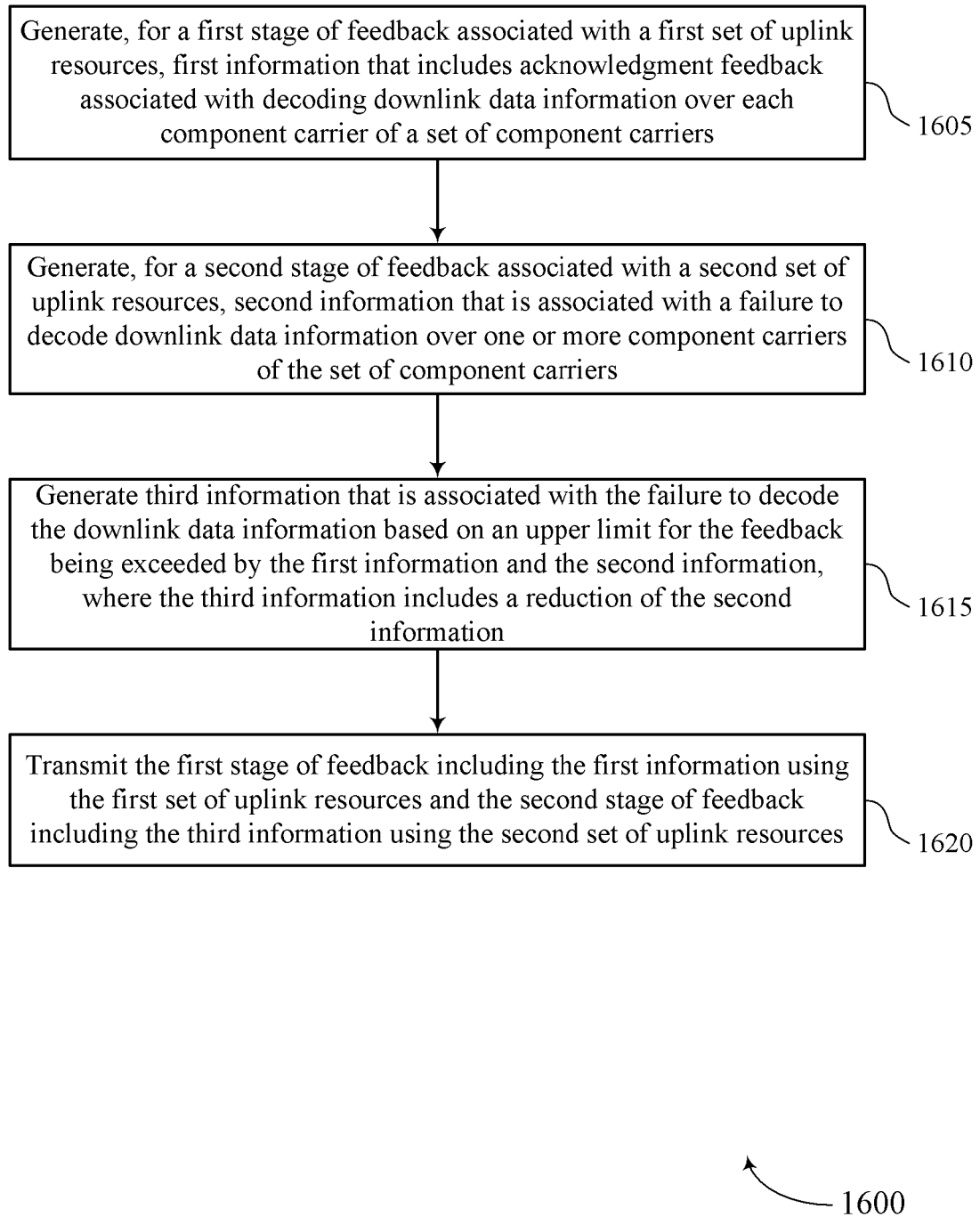
FIGS. 16 through 20 show flowcharts illustrating methods that support two-stage feedback procedures in accordance with aspects of the present disclosure.

FIG. 16 shows a flowchart illustrating a method 1600 that supports two-stage feedback procedures in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may generate, for a first stage of feedback associated with a first set of uplink resources, first information that includes acknowledgment feedback associated with decoding downlink data information over each component carrier of a set of component carriers. The operations of 1605 may be performed according to the methods described herein. In some examples, aspects of the operations of 1605 may be performed by a first stage feedback component as described with reference to FIGS. 8 through 11.

At 1610, the UE may generate, for a second stage of feedback associated with a second set of uplink resources, second information that is associated with a failure to decode downlink data information over one or more component carriers of the set of component carriers. The operations of 1610 may be performed according to the methods described herein. In some examples, aspects of the operations of 1610 may be performed by a second stage feedback component as described with reference to FIGS. 8 through 11.

At 1615, the UE may generate third information that is associated with the failure to decode the downlink data information based on an upper limit for the feedback being exceeded by the first information and the second information, where the third information includes a reduction of the second information. The operations of 1615 may be performed according to the methods described herein. In some examples, aspects of the operations of 1615 may be performed by a second stage feedback component as described with reference to FIGS. 8 through 11.

At 1620, the UE may transmit the first stage of feedback including the first information using the first set of uplink resources and the second stage of feedback including the third information using the second set of uplink resources. The operations of 1620 may be performed according to the methods described herein. In some examples, aspects of the operations of 1620 may be performed by a feedback transmission component as described with reference to FIGS. 8 through 11.

Figure 17:
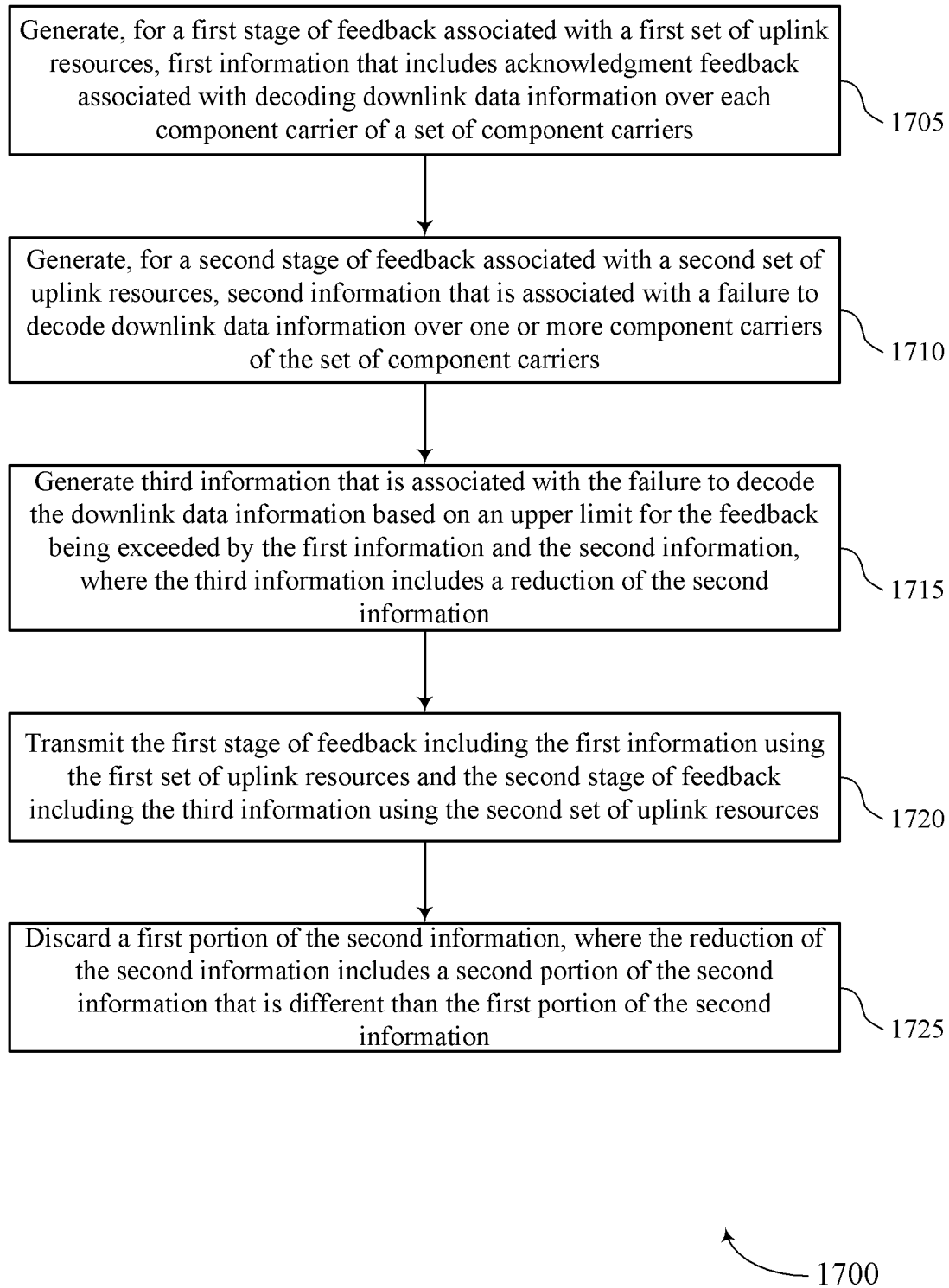

FIG. 17 shows a flowchart illustrating a method 1700 that supports two-stage feedback procedures in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1705, the UE may generate, for a first stage of feedback associated with a first set of uplink resources, first information that includes acknowledgment feedback associated with decoding downlink data information over each component carrier of a set of component carriers. The operations of 1705 may be performed according to the methods described herein. In some examples, aspects of the operations of 1705 may be performed by a first stage feedback component as described with reference to FIGS. 8 through 11.

At 1710, the UE may generate, for a second stage of feedback associated with a second set of uplink resources, second information that is associated with a failure to decode downlink data information over one or more component carriers of the set of component carriers. The operations of 1710 may be performed according to the methods described herein. In some examples, aspects of the operations of 1710 may be performed by a second stage feedback component as described with reference to FIGS. 8 through 11.

At 1715, the UE may generate third information that is associated with the failure to decode the downlink data information based on an upper limit for the feedback being exceeded by the first information and the second information, where the third information includes a reduction of the second information. The operations of 1715 may be performed according to the methods described herein. In some examples, aspects of the operations of 1715 may be performed by a second stage feedback component as described with reference to FIGS. 8 through 11.

At 1720, the UE may transmit the first stage of feedback including the first information using the first set of uplink resources and the second stage of feedback including the third information using the second set of uplink resources. The operations of 1720 may be performed according to the methods described herein. In some examples, aspects of the operations of 1720 may be performed by a feedback transmission component as described with reference to FIGS. 8 through 11.

At 1725, the UE may discard a first portion of the second information, where the reduction of the second information includes a second portion of the second information that is different than the first portion of the second information. The operations of 1725 may be performed according to the methods described herein. In some examples, aspects of the operations of 1725 may be performed by a second stage feedback component as described with reference to FIGS. 8 through 11.

Figure 18:
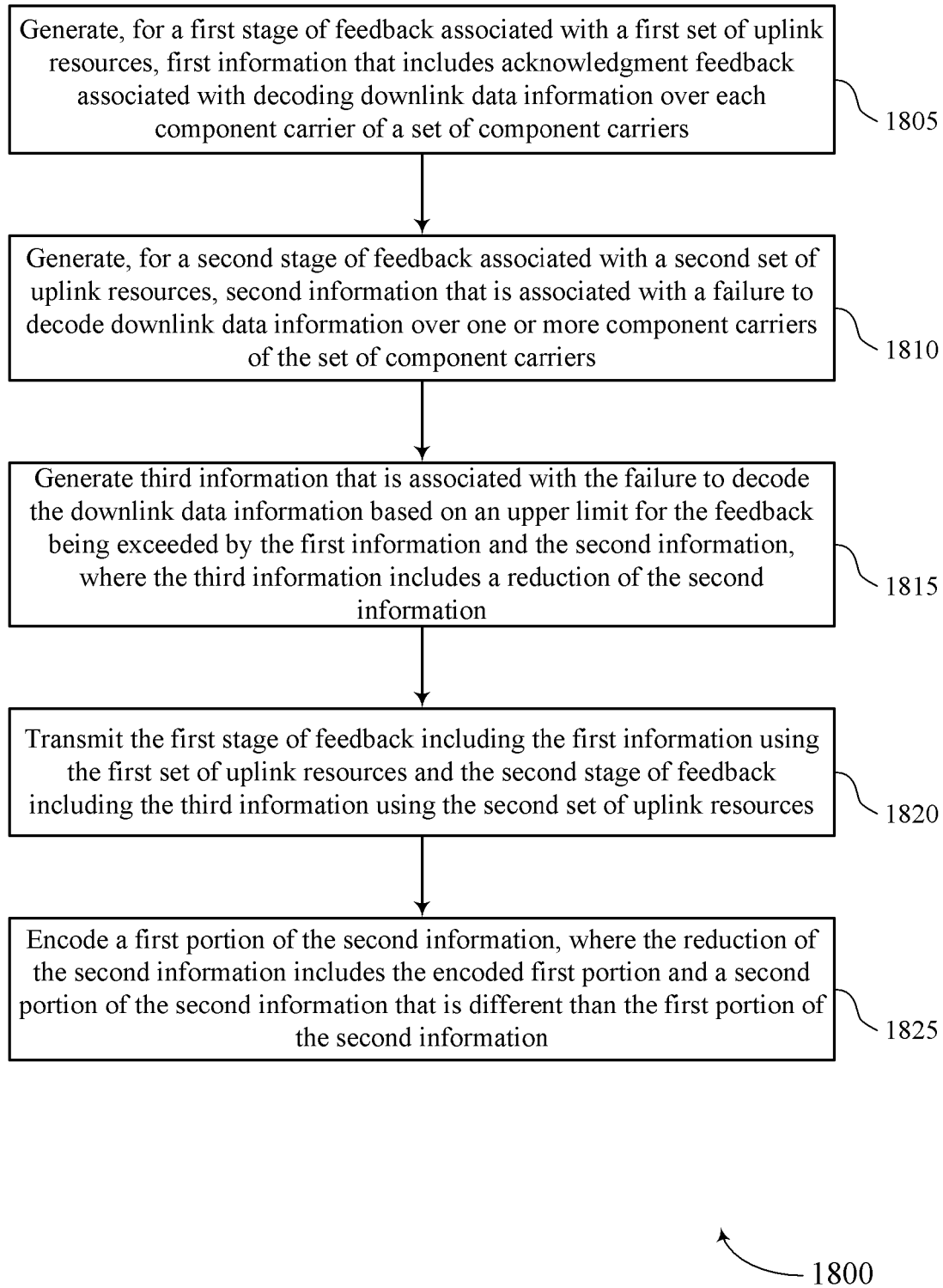

FIG. 18 shows a flowchart illustrating a method 1800 that supports two-stage feedback procedures in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may generate, for a first stage of feedback associated with a first set of uplink resources, first information that includes acknowledgment feedback associated with decoding downlink data information over each component carrier of a set of component carriers. The operations of 1805 may be performed according to the methods described herein. In some examples, aspects of the operations of 1805 may be performed by a first stage feedback component as described with reference to FIGS. 8 through 11.

At 1810, the UE may generate, for a second stage of feedback associated with a second set of uplink resources, second information that is associated with a failure to decode downlink data information over one or more component carriers of the set of component carriers. The operations of 1810 may be performed according to the methods described herein. In some examples, aspects of the operations of 1810 may be performed by a second stage feedback component as described with reference to FIGS. 8 through 11.

At 1815, the UE may generate third information that is associated with the failure to decode the downlink data information based on an upper limit for the feedback being exceeded by the first information and the second information, where the third information includes a reduction of the second information. The operations of 1815 may be performed according to the methods described herein. In some examples, aspects of the operations of 1815 may be performed by a second stage feedback component as described with reference to FIGS. 8 through 11.

At 1820, the UE may transmit the first stage of feedback including the first information using the first set of uplink resources and the second stage of feedback including the third information using the second set of uplink resources. The operations of 1820 may be performed according to the methods described herein. In some examples, aspects of the operations of 1820 may be performed by a feedback transmission component as described with reference to FIGS. 8 through 11.

At 1825, the UE may encode a first portion of the second information, where the reduction of the second information includes the encoded first portion and a second portion of the second information that is different than the first portion of the second information. The operations of 1825 may be performed according to the methods described herein. In some examples, aspects of the operations of 1825 may be performed by a second stage feedback component as described with reference to FIGS. 8 through 11.

Figure 19:
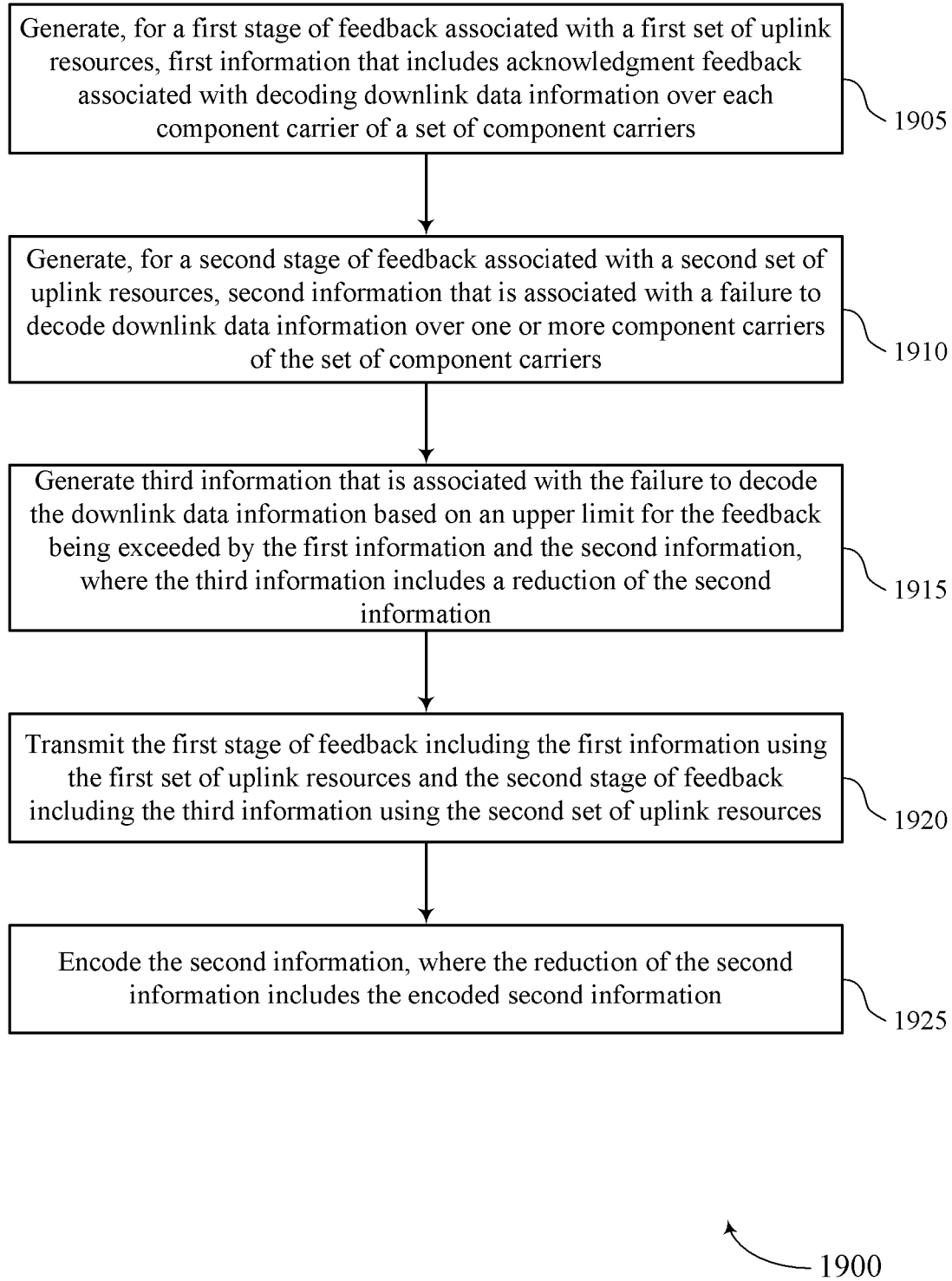

FIG. 19 shows a flowchart illustrating a method 1900 that supports two-stage feedback procedures in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1905, the UE may generate, for a first stage of feedback associated with a first set of uplink resources, first information that includes acknowledgment feedback associated with decoding downlink data information over each component carrier of a set of component carriers. The operations of 1905 may be performed according to the methods described herein. In some examples, aspects of the operations of 1905 may be performed by a first stage feedback component as described with reference to FIGS. 8 through 11.

At 1910, the UE may generate, for a second stage of feedback associated with a second set of uplink resources, second information that is associated with a failure to decode downlink data information over one or more component carriers of the set of component carriers. The operations of 1910 may be performed according to the methods described herein. In some examples, aspects of the operations of 1910 may be performed by a second stage feedback component as described with reference to FIGS. 8 through 11.

At 1915, the UE may generate third information that is associated with the failure to decode the downlink data information based on an upper limit for the feedback being exceeded by the first information and the second information, where the third information includes a reduction of the second information. The operations of 1915 may be performed according to the methods described herein. In some examples, aspects of the operations of 1915 may be performed by a second stage feedback component as described with reference to FIGS. 8 through 11.

At 1920, the UE may transmit the first stage of feedback including the first information using the first set of uplink resources and the second stage of feedback including the third information using the second set of uplink resources. The operations of 1920 may be performed according to the methods described herein. In some examples, aspects of the operations of 1920 may be performed by a feedback transmission component as described with reference to FIGS. 8 through 11.

At 1925, the UE may encode the second information, where the reduction of the second information includes the encoded second information. The operations of 1925 may be performed according to the methods described herein. In some examples, aspects of the operations of 1925 may be performed by a second stage feedback component as described with reference to FIGS. 8 through 11.

Figure 20:
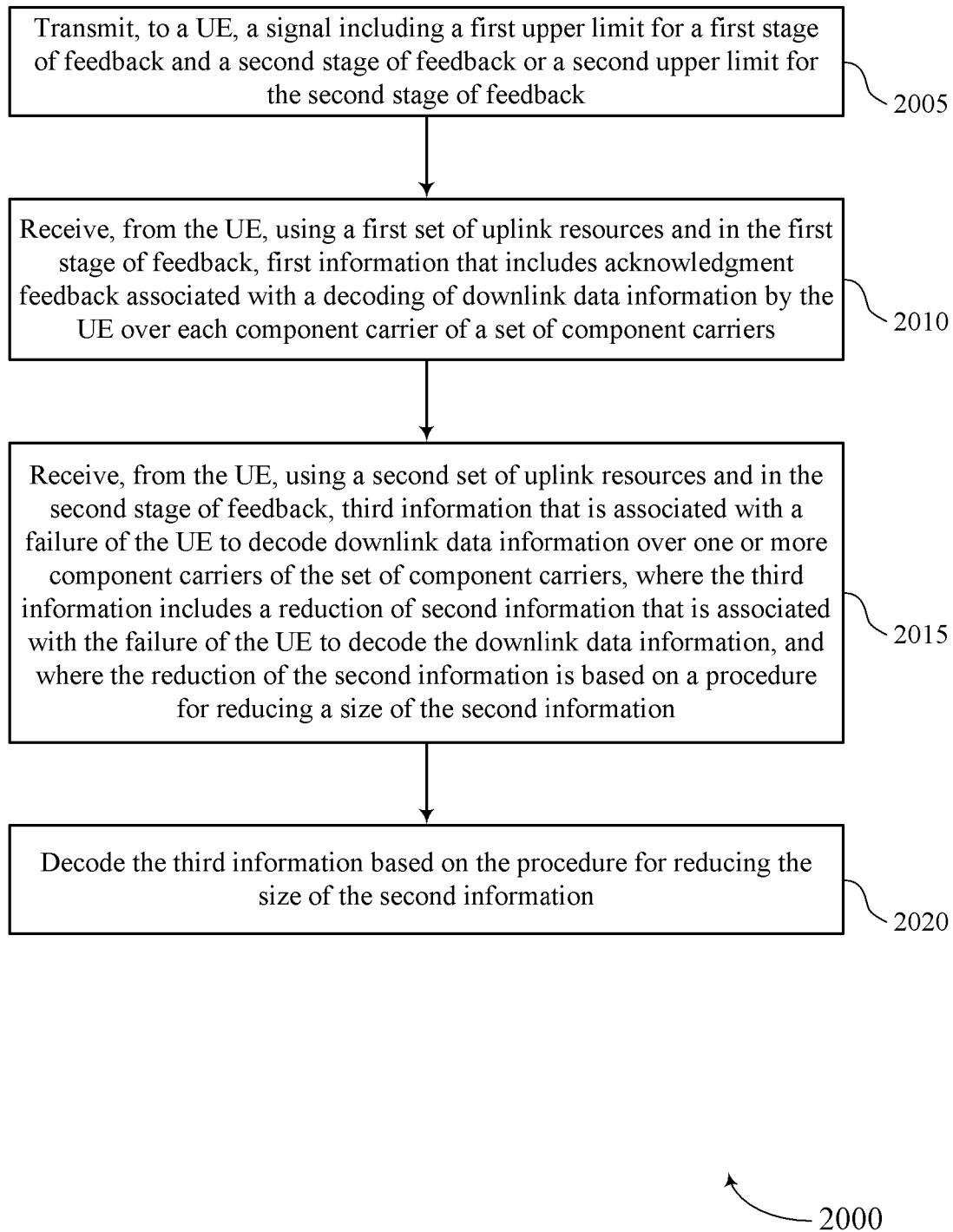

FIG. 20 shows a flowchart illustrating a method 2000 that supports two-stage feedback procedures in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE, a signal including a first upper limit for a first stage of feedback and a second stage of feedback or a second upper limit for the second stage of feedback. The operations of 2005 may be performed according to the methods described herein. In some examples, aspects of the operations of 2005 may be performed by a feedback management component as described with reference to FIGS. 12 through 15.

At 2010, the base station may receive, from the UE, using a first set of uplink resources and in the first stage of feedback, first information that includes acknowledgment feedback associated with a decoding of downlink data information by the UE over each component carrier of a set of component carriers. The operations of 2010 may be performed according to the methods described herein. In some examples, aspects of the operations of 2010 may be performed by a first stage feedback component as described with reference to FIGS. 12 through 15.

At 2015, the base station may receive, from the UE, using a second set of uplink resources and in the second stage of feedback, third information that is associated with a failure of the UE to decode downlink data information over one or more component carriers of the set of component carriers, where the third information includes a reduction of second information that is associated with the failure of the UE to decode the downlink data information, and where the reduction of the second information is based on a procedure for reducing a size of the second information. The operations of 2015 may be performed according to the methods described herein. In some examples, aspects of the operations of 2015 may be performed by a second stage feedback component as described with reference to FIGS. 12 through 15.

At 2020, the base station may decode the third information based on the procedure for reducing the size of the second information. The operations of 2020 may be performed according to the methods described herein. In some examples, aspects of the operations of 2020 may be performed by a data reception component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   generating, for a first stage of feedback associated with a first set of uplink resources, first information that comprises acknowledgment feedback associated with decoding downlink data information over each component carrier of a plurality of component carriers;
   generating, for a second stage of feedback associated with a second set of uplink resources, second information that is associated with a failure to decode downlink data information over one or more component carriers of the plurality of component carriers;

generating, in accordance with one or more priority levels for the plurality of component carriers, third information that is associated with the failure to decode the downlink data information based at least in part on an upper limit for the feedback being exceeded by the first information and the second information, wherein the third information comprises a reduction of the second information; and transmitting the first stage of feedback comprising the first information using the first set of uplink resources and the second stage of feedback comprising the third information using the second set of uplink resources.

2. The method of claim 1, wherein the third information is generated based at least in part on a combined size of the first information and the second information exceeding a first upper limit for the first stage of feedback and the second stage of feedback or a size of the second stage of feedback exceeding a second upper limit for the second stage of feedback.

3. The method of claim 2, further comprising:
receiving a signal comprising a first indication of a first value of the first upper limit or a second indication of a second value of the second upper limit.

4. The method of claim 1, further comprising:
receiving a signal comprising an indication of the one or more priority levels for the plurality of component carriers.

5. The method of claim 4, further comprising:
receiving a second signal comprising an indication of a second priority level for a first component carrier of the plurality of component carriers based at least in part on a configuration of the first component carrier.

6. The method of claim 1, further comprising:
performing a procedure for reducing a size of the second information based at least in part on the upper limit for the feedback being exceeded by the first information and the second information, wherein the third information is generated based at least in part on performing the procedure.

7. The method of claim 1, wherein generating the third information comprises:
discarding a first portion of the second information, wherein the reduction of the second information comprises a second portion of the second information that is different than the first portion of the second information.

8. The method of claim 7, wherein generating the third information further comprises:
identifying a first subset of the second information that is associated with a failure to decode first downlink data information over a first component carrier of the plurality of component carriers, the first subset of the second information having a first length;
identifying a second subset of the second information that is associated with a failure to decode second downlink data information over a second component carrier of the plurality of component carriers, the second subset of the second information having the first length; and
selecting the first subset of the second information based at least in part on a first priority of the first component carrier relative to a second priority of the second component carrier, wherein the discarded first portion of the second information comprises the selected first subset of the second information.

9. The method of claim 8, wherein generating the third information further comprises:
adding, to the second portion of the second information, fourth information in place of the discarded first subset of the second information, the fourth information having a second length that is smaller than the first length.

10. The method of claim 9, wherein generating the third information further comprises:
selecting the second subset of the second information based at least in part on a combined size of the first information and the third information exceeding a first upper limit or a second size of the third information exceeding a second upper limit after the fourth information is added, wherein the discarded first portion of the second information comprises the selected second subset of the second information; and
adding, to the second portion of the second information, fifth information in place of the discarded second subset of the second information, the fifth information having the second length.

11. The method of claim 10, wherein generating the third information further comprises:
selecting the fourth information based at least in part on a third combined size of the first information and the third information exceeding the first upper limit or a third size of the third information exceeding the second upper limit after the fifth information is added; and
discarding the fourth information based at least in part on the selecting.

12. The method of claim 10, wherein:
the first subset of the second information discarded from the second information comprises one of a first bit value for indicating a failure to receive a downlink control message associated with a downlink data message transmitted over the first component carrier, a second bit value for indicating a first quality of the first component carrier, a third bit value for indicating a second quality of the first component carrier, or a fourth bit value for indicating a third quality of the first component carrier, and
the second subset of the second information discarded from the second information comprises one of the first bit value for indicating a failure to receive a second downlink control message associated with a second downlink data message transmitted over the second component carrier, the second bit value for indicating the first quality of the second component carrier, the third bit value for indicating the second quality of the second component carrier, or the fourth bit value for indicating the third quality of the second component carrier.

13. The method of claim 12, wherein:
the fourth information added to the second portion of the second information comprises one of a fifth bit value for indicating the failure to receive the downlink control message or a sixth bit value for indicating a fourth quality of the first component carrier based at least in part on the discarded first subset of the second information, wherein the fifth bit value and the sixth bit value comprise a fewer quantity of bits than the first bit value, the second bit value, the third bit value, or the fourth bit value, and
the fifth information added to the second portion of the second information comprises one of the fifth bit value for indicating the failure to receive the second downlink control message or the sixth bit value for indicating the fourth quality of the second component carrier based at least in part on the discarded first subset of the second information.

14. The method of claim 7, wherein generating the third information further comprises:
identifying a first subset of the second information that is associated with a failure to decode first downlink data information over a first component carrier of the plurality of component carriers, the first subset of the second information having a first length;
identifying a second subset of the second information that is associated with a failure to decode second downlink data information over a second component carrier of the plurality of component carriers, the second subset having the first length; and
selecting a piece of the first subset of the second information based at least in part on a first priority of the first component carrier relative to a second priority of the second component carrier, wherein the discarded first portion of the second information comprises the selected piece of the first subset of the second information.

15. The method of claim 1, wherein generating the third information comprises:
encoding a first portion of the second information, wherein the reduction of the second information comprises the encoded first portion and a second portion of the second information that is different than the first portion of the second information.

16. The method of claim 15, wherein generating the third information further comprises:
identifying at least one subset of the second information that is associated with a failure to decode at least one set of downlink data information over at least one component carrier of the plurality of component carriers, the at least one subset of the second information having a first length;
identifying a plurality of subsets of the second information that is associated with a failure to decode multiple sets of downlink data information over multiple component carriers of the plurality of component carriers, the plurality of subsets of the second information having a first combined length; and
selecting the plurality of subsets of the second information based at least in part on a first priority of the at least one component carrier relative to a second priority of the multiple component carriers, wherein the encoded first portion comprises fourth information resulting from a combination of the selected plurality of subsets of the second information, the fourth information having a second length that is smaller than a combined length of the plurality of subsets of the second information.

17. The method of claim 16, wherein the fourth information comprises one of a first bit value for indicating a first combined quality of the multiple component carriers or a second bit value for indicating a second combined quality of the multiple component carriers.

18. The method of claim 16, wherein the fourth information comprises one of a first bit value for indicating a failure to receive a downlink control message over at least one of the multiple component carriers or a second bit value for indicating a combined quality of the multiple component carriers.

19. The method of claim 1, wherein generating the third information comprises:
encoding the second information, wherein the reduction of the second information comprises the encoded second information.

20. The method of claim 19, wherein generating the third information comprises:
identifying a plurality of subsets of the second information that is associated with a failure to decode multiple sets of downlink data information over multiple component carriers of the plurality of component carriers, the plurality of subsets of the second information having a first combined length that is equivalent to a first length of the second information and greater than a second length of the encoded second information.

21. The method of claim 20, wherein generating the third information comprises:
determining a bit value of a plurality of bit values that corresponds to a combination of the plurality of subsets of the second information based at least in part on a table that provides a mapping between the plurality of bit values and a plurality of combinations of the plurality of subsets of the second information.

22. The method of claim 21, wherein generating the third information comprises:
selecting the table from a plurality of tables based at least in part on a value of the upper limit and a quantity of the one or more component carriers over which the failure to decode downlink data information occurred.

23. The method of claim 1, wherein:
the second information is associated with the failure to decode downlink data information over the one or more component carriers in one or more of a plurality of slots; and
the third information is generated based at least in part on a priority of a first slot of the plurality of slots relative to a second slot of the plurality of slots.

24. The method of claim 23, further comprising:
receiving a signal comprising an indication of a priority level for each slot of the plurality of slots.

25. The method of claim 1, wherein:
the third information is generated based at least in part on a combined size of the first information and the second information exceeding a first upper limit for the first stage of feedback and the second stage of feedback or a size of the second stage of feedback exceeding a second upper limit for the second stage of feedback, and
a second combined size of the first information and the third information is less than or equal to the first upper limit or a second size of the third information is less than or equal to the second upper limit.

26. The method of claim 25, further comprising:
determining that the combined size of the first information and the second information exceeds the first upper limit for the first stage of feedback and the second stage of feedback or that the size of the second information exceeds the second upper limit for the second stage of feedback.

27. The method of claim 1, further comprising:
receiving one or more signals over the plurality of component carriers; and
determining that downlink data information associated with the one or more component carriers failed to be successfully decoded.

28. The method of claim 1, wherein:
the first set of uplink resources are part of a first physical uplink control channel resource and the second set of uplink resources are part of a second physical uplink control channel resource different than the first physical uplink control channel resource, or the first set of uplink resources and the second set of uplink resources are part of a same physical uplink control channel resource.

29. An apparatus for wireless communication at a user equipment (UE), comprising:
a processor,
memory coupled with the processor; and
instructions stored in the memory and executable by the processor to cause the apparatus to:
generate, for a first stage of feedback associated with a first set of uplink resources, first information that comprises acknowledgment feedback associated with decoding downlink data information over each component carrier of a plurality of component carriers;
generate, for a second stage of feedback associated with a second set of uplink resources, second information that is associated with a failure to decode downlink data information over one or more component carriers of the plurality of component carriers;
generate, in accordance with one or more priority levels for the plurality of component carriers, third information that is associated with the failure to decode the downlink data information based at least in part on an upper limit for the feedback being exceeded by the first information and the second information, wherein the third information comprises a reduction of the second information; and
transmit the first stage of feedback comprising the first information using the first set of uplink resources and the second stage of feedback comprising the third information using the second set of uplink resources.

30. An apparatus for wireless communication at a user equipment (UE), comprising:
means for generating, for a first stage of feedback associated with a first set of uplink resources, first information that comprises acknowledgment feedback associated with decoding downlink data information over each component carrier of a plurality of component carriers;
means for generating, for a second stage of feedback associated with a second set of uplink resources, second information that is associated with a failure to decode downlink data information over one or more component carriers of the plurality of component carriers;
means for generating, in accordance with one or more priority levels for the plurality of component carriers, third information that is associated with the failure to decode the downlink data information based at least in part on an upper limit for the feedback being exceeded by the first information and the second information, wherein the third information comprises a reduction of the second information; and
means for transmitting the first stage of feedback comprising the first information using the first set of uplink resources and the second stage of feedback comprising the third information using the second set of uplink resources.

* * * * *